US006919982B2

(12) United States Patent
Nimura et al.

(10) Patent No.: US 6,919,982 B2
(45) Date of Patent: Jul. 19, 2005

(54) OPTICAL PATH DEFLECTING ELEMENT, OPTICAL PATH DEFLECTING APPARATUS, IMAGE DISPLAYING APPARATUS, OPTICAL ELEMENT AND MANUFACTURING METHOD THEREOF

(75) Inventors: Shigeaki Nimura, Chiba (JP); Masanori Kobayashi, Kanagawa (JP); Hiroyuki Sugimoto, Kanagawa (JP); Yasuyuki Takiguchi, Kanagawa (JP); Toshiaki Tokita, Kanagawa (JP); Yumi Matsuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/412,314

(22) Filed: Apr. 14, 2003

(65) Prior Publication Data

US 2004/0001166 A1 Jan. 1, 2004

(30) Foreign Application Priority Data

Apr. 17, 2002 (JP) ............................... 2002-114526
Mar. 24, 2003 (JP) ............................... 2003-080507

(51) Int. Cl.$^7$ ............................... G02F 1/03; G02F 1/07
(52) U.S. Cl. ..................... 359/254; 359/243; 359/252; 359/260
(58) Field of Search ................... 359/251–258, 359/260, 267, 265, 290–291, 295–296, 321–322, 242–243; 345/104; 428/1.1; 349/2, 10, 16, 33–37, 136, 75–76, 86, 133, 47, 132, 171–172, 184, 123

(56) References Cited

U.S. PATENT DOCUMENTS

| 4,941,736 | A | * | 7/1990 | Taniguchi et al. ........... 349/173 |
| 5,619,765 | A |   | 4/1997 | Tokita et al. ................. 15/3 |
| 5,638,842 | A |   | 6/1997 | Tokita et al. ............ 134/104.1 |
| 5,643,380 | A |   | 7/1997 | Saitoh et al. ................. 156/94 |
| 5,644,372 | A | * | 7/1997 | Shinjo et al. ............... 349/139 |
| 5,657,037 | A | * | 8/1997 | Okada et al. ................. 345/94 |
| 5,769,957 | A |   | 6/1998 | Murakami et al. ............ 134/15 |
| 5,923,928 | A |   | 7/1999 | Sugimoto .................... 399/154 |
| 5,926,669 | A |   | 7/1999 | Sugimoto et al. ............. 399/66 |
| 5,969,780 | A |   | 10/1999 | Matsumoto et al. ........ 349/106 |
| 6,006,062 | A |   | 12/1999 | Takahashi et al. .......... 399/310 |

(Continued)

FOREIGN PATENT DOCUMENTS

| JP | 05-313116 | 11/1993 |
| JP | 06-018940 | 1/1994 |
| JP | 06-324320 | 11/1994 |
| JP | 07-092507 | 4/1995 |
| JP | 08-118726 | 5/1996 |
| JP | 09-133904 | 5/1997 |
| JP | 10-133135 | 5/1998 |
| JP | 2939826 | 8/1999 |

*Primary Examiner*—Jordan M. Schwartz
*Assistant Examiner*—Jessica T Stultz
(74) *Attorney, Agent, or Firm*—Oblon, Spivak, McClelland, Maier & Neustadt, P.C.

(57) ABSTRACT

An optical path deflecting element, an optical path deflecting apparatus, an image displaying apparatus, an optical writing apparatus, an optical interconnection apparatus, an optical element, and a fabrication method thereof. The optical path deflecting element includes a pair of transparent substrates, transparent electrode films on the substrates to which a voltage having an inverse polarity is selectively applied, an alignment layer in the inner sides of the substrates, and a liquid crystal layer formed of a chiral smectic C phase between the substrates via the alignment layer and homogeneously aligned by the alignment layer. The optical deflecting element can realize the uniformly-aligned liquid crystal layer more easily than a case in which the liquid crystal is aligned to become in a bistable condition. For this reason, it is possible to improve yield in the fabrication.

52 Claims, 17 Drawing Sheets

U.S. PATENT DOCUMENTS

| | | | |
|---|---|---|---|
| 6,061,042 A | 5/2000 | Takahashi et al. | 345/87 |
| 6,144,832 A | 11/2000 | Nimura et al. | 399/328 |
| 6,151,093 A | 11/2000 | Takiguchi et al. | 349/172 |
| 6,157,795 A | 12/2000 | Kadonaga et al. | 399/66 |
| 6,223,008 B1 | 4/2001 | Takahashi et al. | 399/66 |
| 6,310,677 B1 * | 10/2001 | Togano et al. | 349/172 |
| 6,351,299 B2 | 2/2002 | Takiguchi et al. | 349/121 |
| 6,480,345 B2 | 11/2002 | Kawashima et al. | 359/802 |
| 6,497,488 B1 | 12/2002 | Yamauchi et al. | 353/58 |
| 6,524,759 B1 | 2/2003 | Sugimoto et al. | 430/20 |
| 6,537,711 B1 | 3/2003 | Nimura et al. | 430/20 |
| 2002/0135729 A1 | 9/2002 | Tokita et al. | 344/172 |
| 2003/0098945 A1 | 5/2003 | Sugimoto et al. | 349/172 |

* cited by examiner

DISPLAY PICTURE ELEMENT
IN NON-SHIFTING

DISPLAY PICTURE ELEMENT
IN OBLIQUE-SHIFTING

FIG.21A
OPTICAL PATH DEFLECTION: REFRACTION
(INCIDENT LIGHT WIDTH ≤ SAW-TOOTH PITCH)
FIG.21B
OPTICAL PATH DEFLECTION: DIFFRACTION
(INCIDENT LIGHT WIDTH > SAW-TOOTH PITCH)
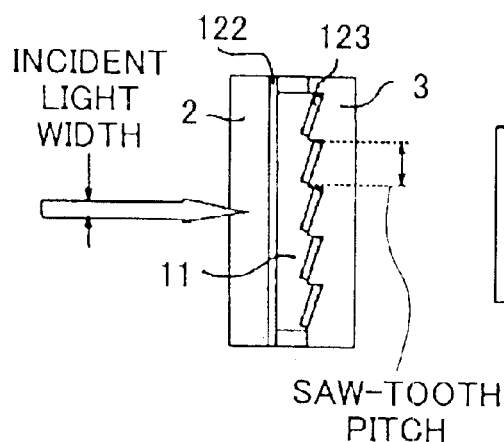
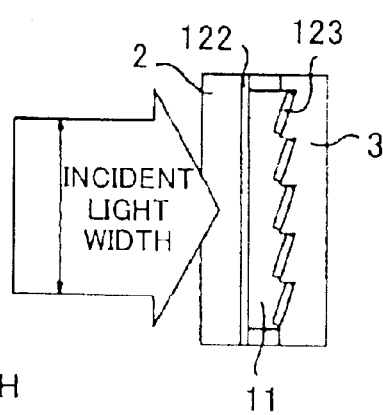
FIG.22
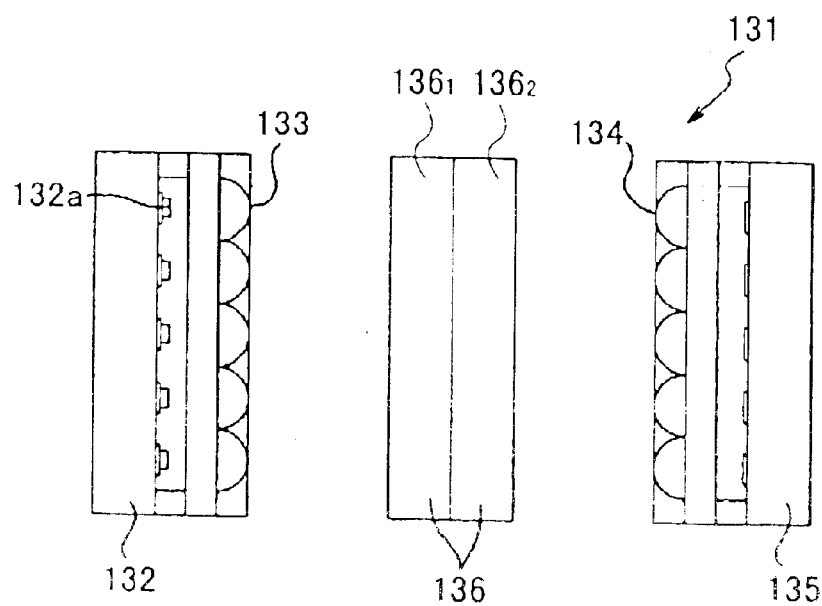

RUBBING DIRECTION

RUBBING DIRECTION

RUBBING DIRECTION

OPTICAL PATH DEFLECTING ELEMENT, OPTICAL PATH DEFLECTING APPARATUS, IMAGE DISPLAYING APPARATUS, OPTICAL ELEMENT AND MANUFACTURING METHOD THEREOF

BACKGROUND OF THE INVENTION

1. Field of the Invention

The present invention generally relates to an optical path deflecting element, an optical path deflecting apparatus, an image displaying apparatus, an optical element, and a manufacturing method thereof.

2. Description of the Related Art

Conventionally, various optical elements are used as optical path deflecting elements. Among them, electrooptic devices formed of materials that have large primary electrooptic effect (Pockels effect), for instance, $KH_2PO_4$(KDP), $NH_4H_2PO_4$(ADP), $LiNbO_3$, $LiTaO_3$, GaAs, CdTe, are well-known. Also, electrooptic devices formed of materials that have large secondary electrooptic effect, for instance, KTN, $SrTiO_3$, $CS_2$, nitrobenzene; are well-known. Furthermore, acoustic optical devices formed of materials, for instance, glass, silica, $TeO_2$, are well-known (ref. "Optoelectronic Devices," edited by S. Aoki, Shokodo). In these conventional optical elements, it is generally necessary to prepare a large length of an optical path so as to ensure a sufficiently large amount of optical deflection. Also, the conventional optical elements have limited uses due to the costly materials.

On the other hand, various optical elements formed of liquid crystal materials are conventionally proposed as the optical path deflecting elements.

Japanese Laid-Open Patent Application No. 06-018940 discloses two kinds of optical beam shifters formed of artificial birefringence plates for the purpose of reduction in optical loss of an optical space switch. One of the optical beam shifters is constituted by disposing two sheets of wedged-shaped transparent substrates to face each other and sandwiching a liquid crystal layer between the two substrates. The other is constituted by connecting the former optical beam shifter to the back surface of a matrix type deflection control element. Furthermore another optical beam shifter is proposed. In the optical beam shifter, two sheets of the wedge-shaped transparent substrates are arranged to face each other. The optical beam shifter includes a plurality of optical beam shifters capable of conducting a matrix drive between the two transparent substrates. These optical beam shifters have liquid crystal layers that can shift an incident optical beam by a half of one cell and are connected in a cascade fashion in a state where each of the optical beam shifters is shifted by a half of a cell.

Japanese Laid-Open Patent Application No. 09-133904 discloses an optical deflection switch that not only achieves large deflection and high deflection efficiency but also allows a deflection angle and a deflection distance to be arbitrarily set. In detail, two sheets of transparent substrates are disposed to face each other at a predetermined space. The facing surfaces thereof are subjected to a perpendicular orientation treatment. Ferroelectric liquid crystal of a smectic A phase is enclosed between these transparent substrates so as to have orientation perpendicular to the transparent substrates. Electrodes are arranged so that alternate current electric fields can be applied in parallel with the smectic layer. The optical deflection switch is a liquid crystal element constructed in the above configuration. In this configuration, since the optical deflection switch can use electric inclination effect caused by the ferroelectric liquid crystal of the smectic A phase, it is possible to change a refractive angle of polarized light incident to a liquid crystal layer and a displacement direction thereof by birefringence due to inclination of the liquid crystal molecules.

However, in the optical beam shifters according to Japanese Laid-Open Patent Application No. 06-018940, since nematic liquid crystal is used as the liquid crystal material therein, it is difficult to increase the response speed by a sub-microsecond. As a result, it is impossible to use the optical beam shifters in a case where high-speed switching is required.

Also, in the optical deflection switch according to Japanese Laid-Open Patent Application No. 09-133904, although the ferroelectric liquid crystal of the smectic A phase is used therein, it is impossible to expect high-speed operations because the smectic A phase has no spontaneous polarization.

Next, some prior arts related to a pixel shift element will be described.

Japanese Patent No. 2939826 discloses a projection display device for projecting an enlarged one of an image displayed in picture elements on a screen by using a projection optical system. The projection display device includes a means for shifting a projection image and a means for projecting projection areas of individual picture elements discretely on a screen through effective reduction in an aperture ratio of the picture element. The projection image shifting means has at least one optical element for rotating the polarization direction of transmitted light in an optical path between the picture element and the screen and at least one transparent element having a birefringence effect.

According to Japanese Patent No. 2939826, however, the projection image shifting means (pixel shifting means), which has at least one of the optical elements (optical rotating elements) capable of rotating the polarization direction and at least one of the transparent elements (birefringence elements) having the birefringence effect, shifts a pixel. Due to the pixel-based shifting, the projection shifting means has some disadvantages. For instance, since the projection shifting means uses a combination of the optical rotating element and the birefringence element, it is impossible to avoid large loss of the light quantity. Also, the resolution tends to be decreased by variations of a pixel shifting amount in accordance with the wavelength of the light. Additionally, a mismatch of the optical rotating element and the birefringence element with respect to the optical characteristics causes optical noise such as a ghost ray due to light leaked in an exterior of a pixel shift, that is, in the place where an image should not be formed. Additionally, it takes a heavy cost to develop and manufacture these elements in general. In particular, if the above-mentioned materials of the large primary electrooptic effect (Pockels effect), for instance, $KH_2PO_4$(KDP), $NH_4H_2PO_4$ (ADP), $LiNbO_3$, $LiTaO_3$, GaAs, CdTe, are used as the birefringence element, these disadvantages become noticeable.

Japanese Laid-Open Patent Application No. 05-313116 discloses a projector for reproducing a high-definition image at a low cost. In the projector, a control circuit samples an image, all of which should have been displayed. Sampled images are stored in an image storage circuit in accordance with a check pattern and then are supplied to a pixel selection part. Then, the sampled images are sequentially projected and displayed by using a spatial optical modulator via the pixel selection part. The control circuit controls a panel rocking mechanism corresponding to the displayed images and changes a pitch interval between adjacent picture elements of the spatial optical modulator by 1/n times (n: integer) so as to restore the image to be originally displayed through compositions of the sampled images with respect to time. According to the projector, it is possible to not only display the image under a resolving power multiplied by some integer of the picture elements of the spatial optical modulator but also implement the projector at a reasonable cost by using the pixel-coarse spatial optical modulator and a simple optical system.

According to Japanese Laid-Open Patent Application No. 05-313116, however, a pixel shift method for rocking an image display element itself by a distance smaller than the pixel pitch at a high speed is adopted. In the pixel shift method, although aberration can be suppressed due to fixing of the optical system therein, a movable part needs precision and durability because of necessity of high-accuracy and high-speed parallel-shifting of the image display element itself. As a result, other problems such as vibration and noise are caused in the projector.

Japanese Laid-Open Patent Application No. 06-324320 discloses a means for changing an optical path. The disclosed invention intends to improve apparent resolution of a displayed picture without increasing the number of picture elements-of a picture display device such as an LCD (Liquid Crystal Display). The picture display device displays a picture through light emissions of individual picture elements, which are arranged in the vertical and the horizontal directions, in accordance with a display picture element pattern. An optical member for changing an optical path for each field is provided between the picture display device and an observer or a screen. The display picture element pattern whose display position is deviated for each field in accordance with variations of the optical path is displayed on the picture display device. In this configuration, since parts whose refractive indexes differ from each other alternatively appear in the optical path between the picture display device and the observer or the screen for each field of the picture information, it is possible to change the optical path.

According to Japanese Laid-Open Patent Application No. 06-324320, a combined mechanism of an electrooptic element and a birefringence material, a lens shift mechanism, a vari-angle prism, a rotating mirror, a rotating glass and so on are described as the optical path deflecting means in the disclosure. Besides the combined mechanism of the electrooptic element and the birefringence element, an optical path switching method for switching an optical path through displacement (parallel shift or inclination) of an optical element such as a lens, a reflection plate, and a birefringence plate by using a voice coil, a piezoelectric element and so on is proposed. However, when this optical path switching method is adopted in the optical path changing means, the optical path changing means cannot help having a complicated structure for driving an optical element therein. As a result, it is impossible to avoid high fabrication cost thereof.

Japanese Laid-Open Patent Application No. 10-133135 discloses a light beam deflecting device that can operate without any rotating mechanical member. As a result, it is possible to provide the small-sized light beam deflecting device that not only has the high precision and the high resolving power but also is tolerant to external vibration. In detail, the light beam deflecting device has a translucent piezoelectric element in a propagation path of an optical beam, a transparent electrode provided on a surface of the piezoelectric element, and a voltage applying part applying a voltage to the piezoelectric element via an electrode so as to deflect the optical axis of the optical beam by changing a length of the optical path between an optical beam enter surface A and an optical beam exit surface B of the piezoelectric element.

According to Japanese Laid-Open Patent Application No. 10-133135, an optical path shifting means for shifting an optical path through variations of a thickness of the translucent piezoelectric element sandwiched between transparent electrodes by applying the voltage is disclosed. However, the optical path shifting means has problems similar to the above-mentioned optical path changing means according to Japanese Laid-Open Patent Application No. 06-324320 in that it is necessary to prepare a comparatively large transparent piezoelectric element and therefore it is impossible to avoid the high fabrication cost thereof.

Next, prior arts related to optical writing apparatuses and optical connection apparatuses will be described.

Japanese Laid-Open Patent Application No. 08-118726 discloses an optical writer for printing data at high resolution by using a focused position control means although the optical writing apparatus uses an illuminant element array of a low resolution therein. In the optical writer, the focused position control means electrooptically changes an exposed position by using a combination of a ferroelectric liquid crystal cell for rotating a polarization surface by 90° and a birefringence plate. In detail, a pair of transparent electrodes and a horizontal alignment layer are provided on a pair of transparent substrates, and a liquid crystal layer formed of ferroelectric liquid crystal of a chiral smectic A phase is sandwiched between the two substrates. When the birefringence plate is provided behind the liquid crystal cell, an optical path shifting part is constituted as follows; light propagates straight in a case where a polarization surface of the light is an ordinary ray component with respect to the birefringence plate, and, on the other hand, the light is shifted in parallel in a case where the polarization surface of the light is an extraordinary ray component. At this time, a shift amount of the light depends on an optical axis direction and a thickness of the birefringence plate. When the optical path shifting part is provided between the illuminant array and a recording body, it is possible to implement the disclosed optical writer.

According to Japanese Laid-Open Patent Application No. 08-118726, a deflection function is realized by using the combination of the ferroelectric liquid crystal cell for rotating a polarization surface by 90° and the birefringence plate. In general, an optical crystal serving as the birefringence plate is expensive. Therefore, when an optical crystal corresponding to a size of the illuminant array is used in the optical writer, it is impossible to avoid a cost increase of the optical writer.

Japanese Laid-Open Patent Application No. 07-092507 discloses an optical deflector that can deflect a plurality of incident optical beams in individual propagation directions. In the optical deflector, saw-toothed grooves are formed on a transparent substrate, and nematic liquid crystal that is aligned in a predetermined direction is enclosed between the saw-toothed substrate and a flat substrate. When the optical writer has electrodes divided in accordance with individual teeth of the saw-toothed substrate, it is possible to change a refractive index of the liquid crystal by applying a voltage to an electric field. In this fashion, the disclosed optical writer can deflect optical beams entering the teeth individually.

According to Japanese Laid-Open Patent Application No. 07-092507, since the optical writer uses the nematic liquid crystal, the optical writer has extremely insufficient response speed of several milliseconds. If the optical writer is used in an optical interconnection or the like, there arises a problem such as large propagation loss of incident light.

In summary, the disclosed conventional pixel shift elements have some disadvantages as follows.

i). Since the pixel shift elements have the complicated structures, it is impossible to avoid an increase in the size and the cost thereof and a loss of a light quantity. Furthermore, optical noise and resolution reduction are caused due to a ghost ray.

ii). If the pixel shift elements have a movable part, the pixel shift elements tend to have problems regarding position accuracy, durability, vibration and noise.

iii). When nematic liquid crystal is used in the pixel shift elements, the nematic liquid crystal has a problem regarding the response speed thereof.

Regarding the response speed in the disadvantage iii), a speed of optical deflection necessary for pixel-shifting in an image display apparatus is estimated as follows. An image field (time tField) is divided into n subfields with respect to the time. An optical path is deflected between an image display element and an optical part for each of the n subfields, and n shifted positions are determined. In this case, time of a subfield tSF is represented in the following formula;

$$tSF = tField/n.$$

The optical paths are deflected during the time period tSF. Time of the optical path deflection is notated as Wshift. Since an image is not displayed in the Wshift, the optical utilization efficiency is decreased corresponding to the time period Wshift.

Here, the optical utilization efficiency E is represented as follows;

$$E = (tSF - Wshift)/tSF.$$

Here, it is supposed that the pixel shift position n=4 and the image field tField=16.7 ms. In order to secure the optical utilization efficiency E of more than 90% under the supposition, it is necessary to satisfy the following inequality;

$$0.9 < (16.7/4 - Wshift)/(16.7/4).$$

It is possible to obtain the following upper bound of Wshift from the above inequality;

$$tshift < 0.42 \text{ (ms)}.$$

Namely, it is necessary to deflect the optical path within the time period 0.42 ms. However, since common nematic liquid crystal responds at a response speed beyond several microseconds, it is impossible to use the nematic liquid crystal as a high-speed pixel shift element.

According to Japanese Laid-Open Patent Application No. 06-018940, since the nematic liquid crystal is used as the liquid crystal therein, it is difficult to improve the response speed to a sub-microsecond. Thus, the disclosed optical beam shifter cannot be adopted as the pixel shift element. Meanwhile, ferroelectric liquid crystal of a chiral smectic C phase can achieve the response speed of sufficiently less than 0.42 ms.

According to Japanese Laid-Open Patent Application No. 09-133904, the ferroelectric liquid crystal of the smectic A phase is used therein. However, since the smectic A phase does not have a spontaneous polarization, the optical deflecting switch cannot operate at high speed compared to the chiral smectic C phase.

Therefore, it is expected to propose an optical deflecting element or an optical deflector that can eliminate the above-mentioned problems, that is, high cost, a large size, light quantity loss and optical noise due to the complicated structure thereof.

Optical deflecting elements and an optical deflecting device that challenge the above-mentioned problems were presented by inventors of this specification. One of the optical deflecting elements includes a pair of transparent substrates, liquid crystal of a homogeneously-aligned chiral smectic C phase injected between the pair of substrates, and an electric field applying part formed of a pair of electrodes provided between the substrates and the liquid crystal. The optical deflecting element is provided such that an incident direction of light is different from a normal line direction of the substrate surface. Another proposed optical deflecting element includes a pair of transparent substrates, liquid crystal of a chiral smectic C phase injected between the substrates, and at least one pair of electric field applying parts. In the optical deflecting element, the two substrates are inclined to face each other corresponding to the optical deflection direction. Furthermore, the proposed optical deflecting device is formed of two pairs of such optical deflecting elements that are positioned at a predetermined interval in the light propagation direction.

According to the optical deflecting element and the optical deflecting device, since liquid crystal of the chiral smectic C phase is used as the liquid crystal material thereof, the optical deflecting element and the optical deflecting device make it possible to perform a high-speed switching operation in comparison with the above-mentioned conventional optical elements. However, it is difficult to uniformly align a region of the liquid crystal of the chiral smectic C phase. In addition, there is no conventional technique for realizing uniform alignment in a case where substrates are not arranged in parallel.

When surface-stabilized ferroelectric liquid crystal of the chiral smectic C phase, which is commonly used as a displaying element, has bistable homogeneous alignment, that is, has a stable condition with respect to two directions, it is possible to perform a successful switching operation between two bistable conditions in accordance with a polarity of an electric field applied to the displaying element. Furthermore, the surface-stabilized ferroelectric liquid crystal of the chiral smectic C phase has other advantages such as a memory property and a high-speed response property. Namely, even if the electric field becomes OFF in the stable conditions, the surface-stabilized ferroelectric liquid crystal of the chiral smectic C phase maintains the stable condition. Also, the surface stabilized ferroelectric liquid crystal of the chiral smectic C phase can respond at a higher speed than smectic A phase liquid crystal and nematic liquid crystal.

If an optical deflecting element is used to adjust a refractive angle on a slope surface through variations of a refractive index of liquid crystal molecules toward incident light by electrically switching an alignment direction of the liquid crystal molecules, it is preferable that such an optical deflecting element can vary the refractive index in a wider range so as to expand the deflection angle. Regarding characteristics of the ferroelectric liquid crystal, it is preferable that such an optical deflecting element have a large difference $\Delta n$ between refractive indexes with respect to the major and the minor axes. Also, it is preferable that the smectic C phase have a large tilt angle and a large cone angle for instance, about 90°. Here, the tilt angle means a slope angle of liquid crystal molecules toward a normal line of the smectic layer, and the cone angle, which is the twice of the tilt angle, means an alignment switch angle at inversion time of an electric field. In order to accurately shift an optical path, it is necessary to provide a perfect homogeneous alignment condition to the ferroelectric liquid crystal layer injected between inclined substrates.

However, when a ferroelectric liquid crystal, whose cone angle is considerably larger than common liquid crystal, is used in order to expand the refractive index difference Δn between the molecule major and minor axes, it is extremely difficult to stably form a bistable homogeneous alignment condition. In particular, smectic liquid crystal, which is ferroelectric liquid crystal having a large cone angle, has extreme difficulty in uniform alignment because the phase transition smectic A phase is not passed.

As a result, if the large cone angle and the bistable homogeneous condition are intended, there is a probability of yield reduction in element fabrication due to defective alignment.

Additionally, when the ferroelectric liquid crystal is applied to an image displaying apparatus that adopts the above-mentioned pixel-shifting fashion, there is a probability of image degradation due to such defective alignment.

SUMMARY OF THE INVENTION

It is a general object of the present invention to provide an optical deflecting element, an optical deflecting apparatus, an image displaying apparatus, an optical writing apparatus, an optical interconnection apparatus, an optical element and a manufacturing method thereof in which the above-mentioned problems are eliminated.

A first more specific object of the present invention is to provide an optical path deflecting element, an optical path deflecting apparatus, an optical element and a manufacturing method thereof that can not only have a large cone angle but also easily realize a uniform alignment condition under configuration wherein a slope region is formed by arranging a pair of transparent substrates at a slope angle and providing a liquid crystal layer of a chiral smectic C phase.

A second more specific object of the present invention is to provide an optical deflecting element, an optical deflecting apparatus and an optical element that have less temperature dependency.

A third more specific object of the present invention is to provide an optical deflecting element, an optical deflecting apparatus and an optical element that can improve stability of an alignment condition of liquid crystal molecules at switching time.

A fourth more specific object of the present invention is to provide an optical deflecting element, an optical deflecting apparatus and an optical element that can deflect an optical path in a wide range.

A fifth more specific object of the present invention is to provide an optical deflecting element, an optical deflecting apparatus and an optical element that achieve a high-speed responsive optical path deflection.

A sixth more specific object of the present invention is to provide an optical deflecting element and an optical deflecting apparatus that are highly efficient through improved optical utilization efficiency.

A seventh more specific object of the present invention is to provide an optical deflecting element and an optical deflecting apparatus that can operate with high accuracy and remove an unnecessary noise ray.

An eighth more specific object of the present invention is to provide an optical deflecting element and an optical deflecting apparatus that can improve efficiency by optimizing material properties of liquid crystal therein and characteristics of incident light.

A ninth more specific object of the present invention is to provide an optical deflecting element and an optical deflecting apparatus that can shift an optical path in parallel.

A tenth more specific object of the present invention is to provide an optical deflecting apparatus that can conduct angle-based deflection or parallel shift for an optical path in two directions each of which is orthogonal to the other.

An eleventh more specific object of the present invention is to provide an image displaying apparatus that can use an image displaying element of less picture elements to display an apparently high-definition image in high optical utilization efficiency without image degradation due to defective alignment by incorporating an optical deflecting apparatus capable of angle deflection and parallel shift in a stable alignment characteristic.

A twelfth more specific object of the present invention is to provide an optical writing apparatus that can use a low-resolution illuminant array to perform high-resolution printing by incorporating an optical path deflecting apparatus capable of angle deflection and parallel shift in high-speed response and a stable alignment characteristic.

A thirteen more specific object of the present invention is to provide an optical interconnection apparatus that makes variable two-dimensional optical wiring, which achieve less light quantity loss based on response, possible by incorporating an optical path deflecting apparatus capable of angle deflection and parallel shift in high-speed response and a stable alignment characteristic.

A fourteen more specific object of the present invention is to provide an optical element manufacturing method for manufacturing an optical element for a wide area at a shorter fabrication time and a smaller cost without additional injection of liquid crystal.

In order to achieve the above-mentioned objects, there is provided according to one aspect of the present invention an optical path deflecting element, comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer, wherein the substrates are arranged such that the substrates have a slope angle between the substrates so as to form a slope region where the liquid crystal layer is formed, the liquid crystal layer is formed by homogeneously aligning liquid crystal therein in a single-stable condition where a stable condition direction and a unstable condition direction are in an identical plane in the slope region, and the stable condition direction and the unstable condition direction alternate in accordance with a polarity of a voltage applied between the transparent electrode films.

According to the above-mentioned invention, the slope region is formed by arranging the pair of transparent substrates at a slope angle. The liquid crystal layer of a chiral smectic C phase is provided in the slope region. In this configuration, liquid crystal of the chiral smectic C phase is aligned to become a single-stable condition where a stable condition direction and an unstable condition direction coexist. As a result, it is possible to realize the uniformly-aligned liquid crystal layer more easily than a case where the liquid crystal is aligned to become a bistable condition. For this reason, it is possible to improve a yield in the fabrication.

In the above-mentioned optical path deflecting element, the liquid crystal layer may be formed of a phase-transition liquid crystal material that does not pass through a smectic A phase.

According to the above-mentioned invention, the liquid crystal layer is formed of a phase-transition liquid crystal material that does not pass through a smectic A phase. As a result, since the liquid crystal layer has little temperature dependency, it is possible to provide an optical path deflecting element that has little temperature dependency with respect to a deflection characteristic.

In the above-mentioned optical path deflecting element, the stable condition direction of the liquid crystal layer in the single-stable condition may be along a major axis direction of liquid crystal molecules in the aligned liquid crystal layer, the unstable condition direction thereof may be along a direction different from the stable condition direction, and only if a voltage is applied between the transparent electrode films, the major axis direction of the liquid crystal molecules may become an alignment direction in accordance with the applied voltage.

According to the above-mentioned invention, when a polarity of the voltage applied between the transparent electrode films is inversed in the optical path deflecting element, it is possible to perform deflection by alternating the stable condition direction and the unstable condition direction.

In the above-mentioned optical path deflecting element, the liquid crystal layer may be aligned such that one of the stable condition direction and the unstable condition direction of the liquid crystal layer in the single-stable condition coincides with a direction perpendicular to a slope direction of the slope region.

According to the above-mentioned invention, one of the two alignment directions, that is, the stable condition direction and the unstable condition direction, of the homogeneous alignment coincides with the direction perpendicular to the slope direction of the slope region. As a result, it is possible to further improve stability of an alignment condition of liquid crystal molecules at switching time and enhance reliability of operations of the optical path deflecting element.

In the above-mentioned optical path deflecting element, one of the substrates may have a saw-toothed periodic structure, whose section has a saw-toothed shape, on a facing surface thereof, and the slope region may have slope surfaces that are divided by a plurality of teeth of the saw-toothed periodic structure.

According to the above-mentioned invention, since the slope surface of the slope region is divided by the plural teeth of the saw-toothed periodic structure formed on the facing surface of the substrate, it is possible to form the continuous slope region from broad perspective in a state where the optical path deflecting element has a limited thickness. As a result, it is possible to provide the optical path deflecting element that can deflect an optical path in a wider area.

In the above-mentioned optical path deflecting element, the stable condition direction and the unstable condition direction of the liquid crystal layer in the single stable condition may be asymmetric to a center axis when a polarization direction of a linear polarization entering the liquid crystal layer is considered as the center axis.

According to the above-mentioned invention, since the stable condition direction and the unstable condition direction in the single-stable condition are made asymmetric with respect to the polarization direction of the linear polarization entering the liquid crystal layer; it is possible to vary the refractive index between the two directions. As a result, it is possible to provide the optical path deflecting element that can respond at high speed by using a chiral smectic C phase.

In the above-mentioned optical path deflecting element, the polarization direction of the linear polarization entering the liquid crystal layer may coincide with one of the stable condition direction and the unstable condition direction of the liquid crystal layer in the single-stable condition.

According to the above-mentioned invention, since the polarization direction of the linear polarization entering the liquid crystal layer coincides with one of the stable condition direction and the unstable condition direction of the liquid crystal layer, it is possible to improve optical utilization efficiency. As a result, it is possible to provide the efficient optical path deflecting element.

Additionally, the above-mentioned optical path deflecting element further may comprise a polarizing plate in a light exit side thereof.

According to the above-mentioned invention, since the optical path deflecting element has the polarizing plate in the light exit side, the optical path deflecting element can use the polarizing plate to remove noise ray components each of which has a different deflection amount and a different polarization direction. As a result, it is possible to improve the contrast in optical path deflection.

In the above-mentioned optical path deflecting element, the liquid crystal layer may have an angle of 90° between the stable condition direction and the unstable condition direction thereof in the single-stable condition, and the polarization direction of the linear polarization entering the liquid crystal layer may be parallel to one of the stable condition direction and the unstable condition direction thereof.

According to the above-mentioned invention, the angle between the stable condition direction and the unstable condition direction is 90° although the angle is not required to be exactly 90°. Additionally, the incident linear polarization is set in parallel to one of two directions in the homogeneous alignment. As a result, since the polarization direction coincides with the major axis or the minor axis of the liquid crystal molecules, it is possible to perform more efficient optical path deflection.

In the above-mentioned optical path deflecting element, the saw-toothed periodic structure on the substrate may be formed such that a height h of a step part between a top and a bottom of the saw-toothed periodic structure falls in a range of $1\ \mu m \leq h \leq 10\ \mu m$.

According to the above-mentioned invention, the optical path deflecting element deflects an optical path of incident light through diffraction based on a shape of the saw-toothed periodic structure, a wavelength of the incident light, and a refractive index of the liquid crystal layer. In this case, when the height h of the step part of the saw-toothed periodic structure is set in the range $1\ \mu m \leq h \leq 10\ \mu m$, it is possible to maximize efficiency of the 1st-diffractive ray of the light. As a result, it is possible to realize the most efficient optical path deflection.

In the above-mentioned optical path deflecting element, the liquid crystal layer may have a refractive index no with respect to an ordinary ray component and a refractive index ne with respect to an extraordinary ray component one of which is set in a range of ±7% toward a refractive index ng of the saw-toothed periodic structure on the substrate.

According to the above-mentioned invention, the optical path deflecting element deflects an optical path of incident light through diffraction based on a shape of the saw-toothed periodic structure, a wavelength of the incident light, and a refractive index of the liquid crystal layer. In this case, when the refractive index of the liquid crystal layer no/ne is set in the range within ±7% toward the refractive index ng of the saw-toothed periodic structure, it is possible to suppress deflected ray components that appear as noise rays for straight light.

In the above-mentioned optical path deflecting element, the refractive index ng of the saw-toothed periodic structure on the substrate, the refractive index no/ne of the liquid-crystal layer with respect to the ordinary ray component/the extraordinary ray component, and the height h of the step part of the saw-toothed periodic structure on the substrate may be set to satisfy an inequality for a wavelength λ of at least a portion of incident light;

$$0.8 \cdot \Delta n \cdot h \leq \lambda \leq 1.25 \cdot \Delta n \cdot h,$$

where Δn is an absolute value of a difference between the refractive index ng of the saw-toothed periodic structure and the refractive index no/ne of the liquid crystal layer with respect to the ordinary ray component/the extraordinary ray component, that is, $\Delta n = |ng - no/ne|$.

According to the above-mentioned invention, the optical path deflecting element deflects an optical path of incident light through diffraction based on a shape of the saw-toothed periodic structure, a wavelength of the incident light, and a refractive index of the liquid crystal layer. In this case, when the absolute value Δn of the refractive index difference, the height h of the step part, and the wavelength λ of incident light satisfy the inequality $0.8 \cdot \Delta n \cdot h \leq \lambda \leq 1.25 \cdot \Delta n \cdot h$, it is possible to suppress straight light components that become noise rays for the optical path deflection.

In the above-mentioned optical path deflecting element, the slope region for the liquid crystal layer may be divided into a first slope region and a second slope region located at a predetermined interval with respect to a propagation direction of incident light, the first slope region and the second slope region may be arranged in parallel to face each other such that the incident light is deflected in accordance with a difference between refractive indexes of the first slope region and the liquid crystal layer, the deflected light may be deflected once again in accordance with a difference between refractive indexes of the second slope region and the liquid crystal layer, and the deflected light may exit in parallel to the incident light.

According to the above-mentioned invention, when an optical path deflecting element conventionally has just one slope region, the optical path deflecting element simply changes an outgoing angle of incident light. However, the optical path deflecting element according to the above-mentioned invention has the first and the second separated slope regions, and the first and the second slope surface thereof are arranged in parallel to face each other. As a result, it is possible to shift an optical path of the incident light in parallel.

Additionally, the above-mentioned optical path deflecting element may further comprise a transparent middle substrate locating the first slope region away from the second slope region at a predetermined interval.

According to the above-mentioned invention, since the optical path deflecting element has the transparent middle substrate for separating the first and the second slope regions at a predetermined space, it is possible to easily implement the optical path deflecting element that has the first and the second slope regions. Furthermore, it is possible to adjust a shift amount of incident light in accordance with a thickness of the middle substrate.

Additionally, there is provided according to another aspect of the present invention an optical path deflecting apparatus, comprising: an optical path deflecting element comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer; and a voltage applying part applying a voltage of an inversed polarity selectively between the transparent electrode films of the optical path deflecting element, wherein the substrates are arranged such that the substrates have a slope angle between the substrates so as to form a slope region where the liquid crystal layer is formed, the liquid crystal layer is formed by homogeneously aligning liquid crystal therein in a single-stable condition where a stable condition direction and a unstable condition direction are in an identical plane in the slope region, and the stable condition direction and the unstable condition direction alternate in accordance with a polarity of a voltage applied between the transparent electrode films.

According to the above-mentioned invention, the voltage applying part switches a polarity of a voltage applied between the transparent electrode films of the optical path deflecting element that has a stable alignment characteristic. In this case, when the stable condition direction and the unstable condition direction are switched by using the voltage applying part, it is possible to reliably deflect an optical path of incident light.

Additionally, there is provided according to another aspect of the present invention an optical path deflecting apparatus, comprising: a first optical path deflecting element comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer; a second optical path deflecting element comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer; and a voltage applying part applying a voltage of an inversed polarity selectively between the transparent electrode films of the first optical path deflecting element and the second optical path deflecting element, wherein the substrates are arranged such that the substrates have a slope angle between the substrates so as to form a slope region where the liquid crystal layer is formed, the liquid crystal layer is formed by homogeneously aligning liquid crystal therein in a single-stable condition where a stable condition direction and a unstable condition direction are in an identical plane in the slope region, the stable condition direction and the unstable condition direction alternate in accordance with a polarity of a voltage applied between the transparent electrode films, and the first optical path deflecting element and the second optical path deflecting element are provided in an identical optical path such that an optical path deflection direction of the first optical path deflecting element is orthogonal to an optical path deflection direction of the second optical path deflecting element.

According to the above-mentioned invention, the two optical path deflecting elements each of which can deflect an optical path in one direction are arranged in the optical path deflecting apparatus such that the deflection directions are orthogonal to each other. As a result, it is possible to realize two-dimensional optical path deflection (angle deflection or parallel shift) in simple configuration.

Additionally, the above-mentioned optical path deflecting apparatus may further comprise a polarization direction switching part switching a polarization direction of light from the first optical path deflecting element by an angle of 90°, the polarization direction switching part being provided between the first optical path deflecting element and the second optical path deflecting part.

According to the above-mentioned invention, the two optical path deflecting elements each of which can deflect an optical path in one direction are arranged in the optical path deflecting apparatus such that the deflection directions are orthogonal to each other. In this configuration, when the polarization direction switching part rotates a polarization direction of outgoing light from the first optical path deflecting element by 90° and delivers the resulting light to the second optical path deflecting element, it is possible to properly perform two-dimensional deflection (angle deflection or parallel shift).

In the above-mentioned optical path deflecting apparatus, the first optical path deflecting element and the second optical path deflecting element may be provided such that a maximal slope direction of the slope region of the first optical path deflecting element becomes orthogonal to a maximal slope direction of the slope region of the second optical path deflecting element.

According to the above-mentioned invention, the first and the second optical path deflecting elements are arranged in the optical path deflecting apparatus such that the maximal slope directions of the slope regions thereof become orthogonal to each other by rotation of 90°. As a result, it is possible to realize the arrangement where the deflection directions are orthogonal to each other.

In the above-mentioned optical path deflecting apparatus, the polarization direction switching part may be a half-wavelength plate.

According to the above-mentioned invention, when the half-wavelength plate formed of crystal and mica is used as the polarization direction switching part, it is possible to easily implement the optical path deflecting apparatus.

In the above-mentioned optical path deflecting apparatus, the polarization direction switching part may be a twist-nematic liquid crystal cell.

According to the above-mentioned invention, when the twist-nematic liquid crystal cell is used as the polarization direction switching part and an alignment direction of the enter side substrate coincides with a polarization direction of incident light, the light is transmitted from the twist-nematic liquid crystal cell in a state where the polarization direction thereof is rotated by 90°. As a result, it is possible to easily implement the optical path deflecting apparatus without electric field driving of the twist-nematic liquid crystal cell.

Additionally, there is provided according to another aspect of the present invention an image displaying apparatus, comprising: an image displaying element being formed of a plurality of two-dimensionally arranged picture elements capable of controlling light in accordance with image information; an illuminant apparatus illuminating the image displaying element; an optical apparatus monitoring an image pattern displayed on the image displaying element; a display driving part forming an image field of a plurality of temporally-divided subfields; and an optical path deflecting apparatus deflecting an optical path of light from each of the picture elements of the image displaying element for each of the subfields, the optical path deflecting apparatus comprising: an optical path deflecting element comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer; and a voltage applying part applying a voltage of an inversed polarity selectively between the transparent electrode films of the optical path deflecting element, wherein the substrates are arranged such that the substrates have a slope angle between the substrates so as to form a slope region where the liquid crystal layer is formed, the liquid crystal layer is formed by homogeneously aligning liquid crystal therein in a single-stable condition where a stable condition direction and a unstable condition direction are in an identical plane in the slope region, and the stable condition direction and the unstable condition direction alternate in accordance with a polarity of a voltage applied between the transparent electrode films.

According to the above-mentioned invention, since the above-mentioned optical path deflecting apparatus is used as the pixel-shift device thereof, it is possible to deflect projected optical paths corresponding to the subfield images at high speed. As a result, it is possible to display an apparently high-definition image and avoid image degradation due to defective alignment.

In the above-mentioned image displaying apparatus, one of the substrates of the optical path deflecting apparatus may have a saw-toothed periodic structure, whose section has a saw-toothed shape, on a facing surface thereof, the slope region of the substrate may have slope surfaces that are divided by a plurality of teeth of the saw-toothed periodic structure, and the saw-toothed periodic structure may have a pitch d as follows;

$$0.9 \cdot (2 \cdot \lambda \cdot L/X) < d < 1.1 \cdot (2 \cdot \lambda \cdot L/X),$$

where $\lambda$ is a wavelength of all or a portion of incident light, L is a length of an optical path between the image displaying element and the optical path deflecting element, and X is a pitch of picture elements of the image displaying element.

According to the above-mentioned invention, the optical path deflecting apparatus has the saw-toothed periodic structure whose pitch d is set in the range $0.9 \cdot (2 \cdot \lambda \cdot L/X) < d < 1.1 \cdot (2 \cdot \lambda \cdot L/X)$. In this tilt shift (angle deflection) structure, since the optical path deflecting apparatus can deflect projected optical paths corresponding to the subfield images at high speed, it is possible to display an apparently high-definition image. At this time, since the optical path deflecting apparatus is not required to have an opposite saw-toothed periodic structure and a middle substrate used in the parallel shift structure, it is possible to implement the image displaying apparatus in comparatively simple configuration. Furthermore, it is possible to improve optical utilization efficiency because of favorable transmittance and avoid image degradation due to defective alignment.

In the above-mentioned image displaying apparatus, the optical path deflecting apparatus may be arranged to deflect an optical path in an oblique direction with respect to an array direction of the two-dimensionally arranged picture elements of the image displaying element.

According to the above-mentioned invention, the above-mentioned optical path deflecting apparatus is used as the pixel-shift device, and edge lines of the saw-toothed periodic structure of the optical path deflecting apparatus are inclined (at an angle of 45°) with respect to the array direction of picture elements of the image displaying element. As a result, since the optical path deflecting apparatus can obliquely deflect projected optical paths corresponding to the subfield images at high speed, it is possible to display an apparently high-definition image. When the optical path deflecting apparatus can perform such oblique deflection, it is possible to obtain the same high resolution displaying effect by using just one optical path deflecting apparatus as a case where two optical path deflecting apparatuses are used in the image displaying apparatus.

In the above-mentioned image displaying apparatus, one of the substrates of the optical path deflecting apparatus may have a saw-toothed periodic structure, whose section has a saw-toothed shape, on a facing surface thereof, the slope region of the substrate may have slope surfaces that are divided by a plurality of teeth of the saw-toothed periodic structure, and the saw-toothed periodic structure may have a pitch d as follows;

$$0.9 \cdot (2\sqrt{2} \cdot \lambda \cdot L/X) < d < 1.1 \cdot (2\sqrt{2} \cdot \lambda \cdot L/X),$$

where $\lambda$ is a wavelength of all or a portion of incident light, L is a length of an optical path between the image displaying element and the optical path deflecting element, and X is a pitch of picture elements of the image displaying element.

According to the above-mentioned invention, the optical path deflecting apparatus has the saw-toothed periodic structure whose pitch is set in the range $0.9 \cdot (2\sqrt{2} \cdot \lambda \cdot L/X) < d < 1.1 \cdot (2\sqrt{2} \cdot \lambda \cdot L/X)$, and edge lines of the saw-toothed periodic structure of the optical path deflecting apparatus are inclined (at an angle of 45°) with respect to the array direction of picture elements of the image displaying element. In this tilt shift (angle deflection) structure, since the optical path deflecting apparatus can deflect projected optical paths corresponding to the subfield images at high speed obliquely to the picture element array, it is possible to display an apparently high-definition image and realize a high-resolution display by using just one optical path deflecting apparatus. Furthermore, it is possible to improve optical utilization efficiency and avoid image degradation due to defective alignment.

Additionally, there is provided according to another aspect of the present invention an optical writing apparatus, comprising: an illuminant array being formed by arranging a plurality of illuminants at a predetermined pitch of picture elements; an optical lens focusing rays emitted from the illuminants on a recording body; and an optical path deflecting apparatus shifting optical paths of the rays emitted from the illuminants in an array direction of the illuminants, the optical path deflecting apparatus comprising: an optical path deflecting element comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer; and a voltage applying part applying a voltage of an inversed polarity selectively between the transparent electrode films of the optical path deflecting element, wherein the substrates are arranged such that the substrates have a slope angle between the substrates so as to form a slope region where the liquid crystal layer is formed, the liquid crystal layer is formed by homogeneously aligning liquid crystal therein in a single-stable condition where a stable condition direction and a unstable condition direction are in an identical plane in the slope region, and the stable condition direction and the unstable condition direction alternate in accordance with a polarity of a voltage applied between the transparent electrode films.

According to the above-mentioned invention, since an optical path can be shifted in the array direction of the illuminant array, it is possible to radiate rays that interpolate areas between pitches of the picture elements on the recording body. As a result, it is possible to realize high-resolution image exposure. Furthermore, it is possible to increase response speed at low electric field driving.

In the above-mentioned optical path deflecting element, at least one of the transparent electrodes may have a divided line electrode structure corresponding to a pitch of a saw-toothed periodic structure on the substrates.

According to the above-mentioned invention, since a transparent electrode is divided in a line shape corresponding to the pitch of the saw-toothed periodic structure, it is possible to deflect incident rays to the teeth of the saw-toothed periodic structure individually. Also, if an electric field is periodically applied, it is possible to set new deflection direction of incident rays and deflect the incident rays in accordance with the number and a width of the incident rays.

Additionally, there is provided according to another aspect of the present invention an optical interconnection apparatus, comprising: an illuminant array generating an optical beam array; a lens array focusing the optical beam array; an optical detector array receiving the optical beam array; a plurality of optical path deflecting apparatuses deflecting a propagation direction of the optical beam array, the optical path deflecting apparatuses being arranged in a cascade fashion between the illuminant array and the optical detector array, each of the optical path deflecting apparatuses comprising: an optical path deflecting element comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer; and a voltage applying part applying a voltage of an inversed polarity selectively between the transparent electrode films of the optical path deflecting element, wherein the substrates are arranged such that the substrates have a slope angle between the substrates so as to form a slope region where the liquid crystal layer is formed, the liquid crystal layer is formed by homogeneously aligning liquid crystal therein in a single-stable condition where a stable condition direction and a unstable condition direction are in an identical plane in the slope region, the stable condition direction and the unstable condition direction alternate in accordance with a polarity of a voltage applied between the transparent electrode films, and one of the transparent electrodes has a divided line electrode structure corresponding to a pitch of a saw-toothed periodic structure on the substrates.

According to the above-mentioned invention, since a plurality of the above-mentioned optical path deflecting apparatuses are provided to the optical interconnection apparatus in a cascade fashion, it is possible to realize high-speed responsive optical wiring in a two-dimensional direction.

Additionally, there is provided according to another aspect of the present invention an optical element, comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer, wherein the substrates are arranged such that the substrates have a slope angle between the substrates so as to form a slope region where the liquid crystal layer is formed, and the liquid crystal layer is formed by homogeneously aligning liquid crystal therein in a single-stable condition where a stable condition direction and a unstable condition direction are in an identical plane in the slope region.

According to the above-mentioned invention, the pair of transparent substrates are arranged to have a slope angle so as to form the slope region between the substrates. The liquid crystal layer of the chiral smectic C phase is injected into the slope region. In this configuration, since the liquid crystal of the chiral smectic C phase is aligned in the single-stable condition where the stable condition direction and the unstable condition direction coexist, it is possible to uniformly aligning the liquid crystal more easily than a case where the liquid crystal aligned in a bistable condition. As a result, it is possible to improve fabrication yield.

In the above-mentioned optical element, the liquid crystal layer may be formed of a phase-transition liquid crystal material that does not pass through a smectic A phase.

According to the above-mentioned invention, since the liquid crystal layer is formed of a phase-transition liquid crystal material that does not pass through the smectic A phase of a larger con angle, it is possible to provide the less temperature-dependent optical element.

In the above-mentioned optical element, the liquid crystal layer may be aligned such that one of the stable condition direction and the unstable condition direction of the liquid crystal layer in the single stable condition coincides with a direction perpendicular to a slope direction of the slope region.

According to the above-mentioned invention, since one of the homogeneous alignment directions (the stable condition direction and the unstable condition direction) coincides with a direction perpendicular to the slope direction of the slope region, for instance, it is possible to further improve stability in the alignment condition of liquid crystal molecules at switching time. Therefore, it is possible to improve reliability on operations of the optical element.

In the above-mentioned optical element, one of the substrates may have a saw-toothed periodic structure, whose section has a saw-toothed shape, on a facing surface thereof, and the slope region may have slope surfaces that are divided by a plurality of teeth of the saw-toothed periodic structure.

According to the above-mentioned invention, since the slope surface of the slope region is divided by a plurality of the teeth of the saw-toothed periodic structure provided on the facing surface of one of the substrates, it is possible to form continuous slope regions from broad perspective in a state where the optical element has a limited thickness.

In the above-mentioned optical element, the slope region for the liquid crystal layer may be divided into a first slope region and a second slope region located at a predetermined interval with respect to a propagation direction of incident light, the first slope region and the second slope region may be arranged in parallel to face each other such that the incident light is deflected in accordance with a difference between refractive indexes of the first slope region and the liquid crystal layer, the deflected light may be deflected once again in accordance with a difference between refractive indexes of the second slope region and the liquid crystal layer, and the deflected light may exit in parallel to the incident light.

According to the above-mentioned invention, the optical element has the first and the second slope regions, and the first and the-second slope surfaces thereof are arranged in parallel to face each other. As a result, it is possible to shift an optical path in parallel.

Additionally, the above-mentioned optical path deflecting element may further comprise a transparent middle substrate locating the first slope region away from the second slope region at a predetermined interval.

According to the above-mentioned invention, when the transparent middle substrate is provided so as to separate the first and the second slope regions at a predetermined interval, it is possible to easily implement the optical element.

Additionally, there is provided according to another aspect of the present invention an optical element manufacturing method for manufacturing an optical element comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer, wherein the substrates are arranged such that the substrates have a slope angle between the substrates so as to form a slope region where the liquid crystal layer is formed, and the liquid crystal layer is formed by homogeneously aligning liquid crystal therein in a single-stable condition where a stable condition direction and a unstable condition direction are in an identical plane in the slope region, the optical element manufacturing method comprising: an alignment processing step of applying a voltage between the transparent electrode films under control of speed of decreasing a temperature in a cooling process from one of an isotropic phase and a cholesteric phase and setting a stable condition direction in a single stable condition by homogeneously aligning liquid crystal in the liquid crystal layer.

According to the above-mentioned invention, in the alignment processing step, a voltage is applied between the transparent electrode films under the control of the temperature decreasing speed in the cooling process from the isotropic phase or the cholesteric phase, and the liquid crystal in the liquid crystal layer is homogeneously aligned so as to set the stable condition direction in the single-stable condition. As a result, it is possible to easily manufacture the above-mentioned optical element with high yield.

Additionally, there is provided according to another aspect of the present invention an optical element manufacturing method for manufacturing an optical element comprising: a pair of transparent substrates being arranged to face each other; transparent electrode films being provided on the substrates, the transparent electrode films to which a voltage having an inverse polarity is selectively applied; an alignment layer being provided in inner sides of the substrates; and a liquid crystal layer being formed of a chiral smectic C phase between the substrates via the alignment layer, the liquid crystal layer being homogeneously aligned by the alignment layer, wherein the substrates are arranged such that the substrates have a slope angle between the substrates so as to form a slope region where the liquid crystal layer is formed, the liquid crystal layer is formed by homogeneously aligning liquid crystal therein in a single-stable condition where a stable condition direction and a unstable condition direction are in an identical plane in the slope region, the slope region for the liquid crystal layer is divided into a first slope region and a second slope region located at a predetermined interval, the first slope region and the second slope region are arranged in parallel to face each other such that incident light is deflected in accordance with a difference between refractive indexes of the first slope region and the liquid crystal layer, the deflected light is deflected once again in accordance with a difference between refractive indexes of the second slope region and the liquid crystal layer, and the deflected light exits in parallel to the incident light, the optical element manufacturing method comprising: a liquid crystal injection step of injecting liquid crystal along the saw-toothed periodic structure formed on a facing surface of one of the substrates.

According to the above-mentioned invention, in order to manufacture the optical element that has the saw-toothed periodic structure in the facing surface of one of the substrates and is suitable to wide area deflection, when the liquid crystal is injected along the periodic structure of the saw-toothed periodic structure, it is possible to efficiently inject the liquid crystal, that is, to reduce injection time of the liquid crystal without injecting extra liquid crystal. As a result, it is possible to decrease the fabrication cost.

Other objects, features and advantages of the present invention will become more apparent from the following detailed description when read in conjunction with the accompanying drawings.

BRIEF DESCRIPTION OF THE DRAWINGS

FIGS. 21A and 21B are side views of the optical deflecting apparatus for explaining optical path deflection through refraction and diffraction, respectively;

FIG. 22 is a side view of an optical interconnection apparatus according to a ninth embodiment of the present invention;

DETAILED DESCRIPTION OF THE PREFERRED EMBODIMENTS

In the following, embodiments of the present invention will be described with reference to the accompanying drawings.

A description will now be given, with reference to FIG. 1 through FIG. 5, of an optical deflecting element according to the first embodiment of the present invention. The optical deflecting element fundamentally changes a light exit angle on a slope surface through variations of a refractive index of liquid crystal molecules toward incident light by electrically alternating the alignment direction of the liquid crystal molecules. In this specification, the optical deflecting element means an optical element that can deflect an optical path in accordance with an external electronic signal, that is, an optical element that can shift incident light in parallel (parallel shift), rotate the incident light by a predetermined angle (angle deflection) or shift the optical path in a combination of the parallel shift and the angle deflection.

Figure 1A:
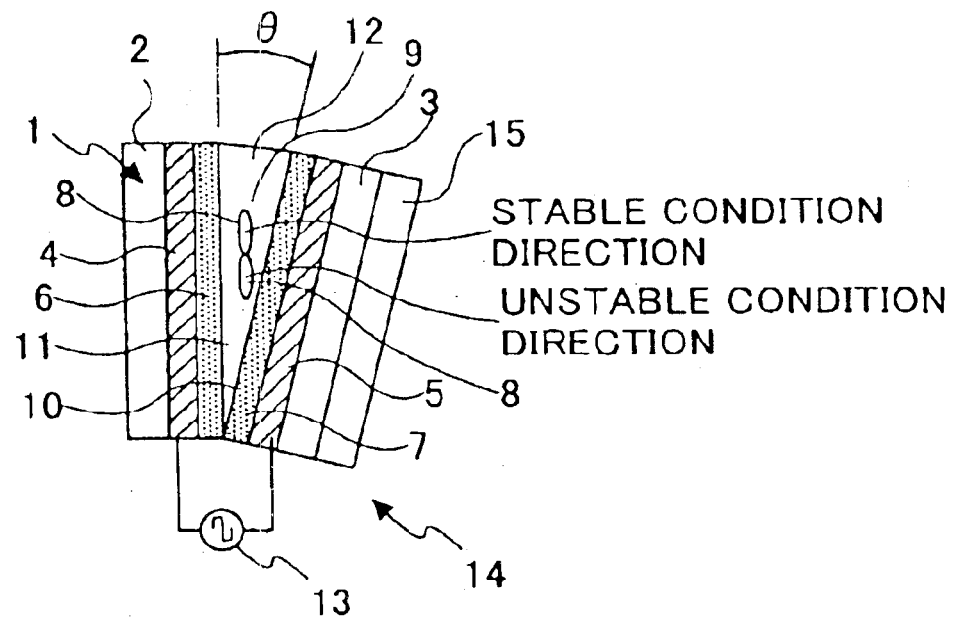
FIGS. 1A and 1B are a sectional view with respect to an A—A line and a front view, respectively, of an optical deflecting element and an optical defecting apparatus according to a first embodiment of the present invention.
Figure 1B:
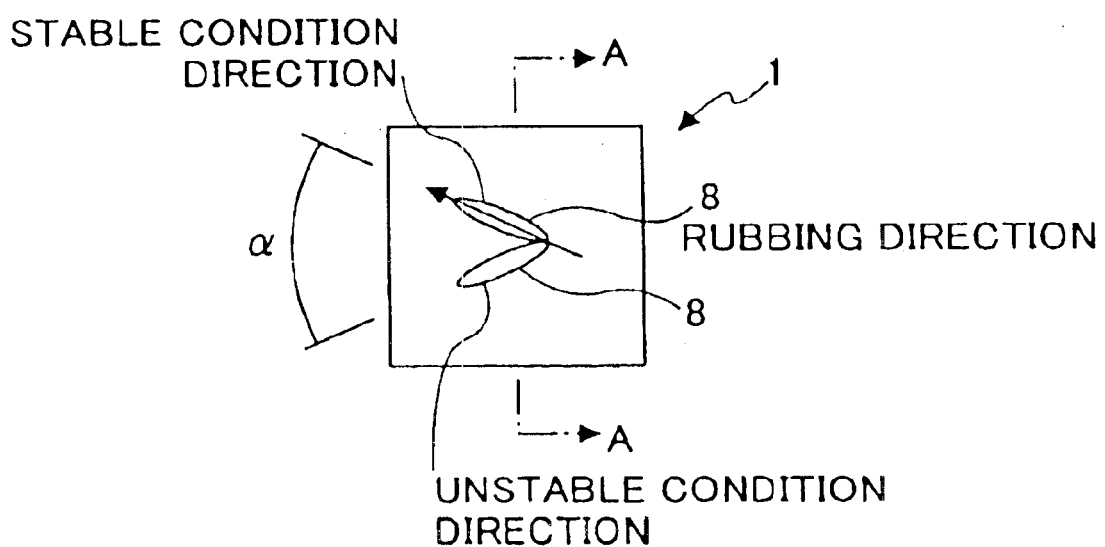

FIGS. 1A and 1B roughly show a structure of an optical deflecting element (optical element) and an optical deflecting apparatus according to the first embodiment. In FIG. 1A, an optical deflecting element 1 comprises a pair of transparent substrates 2 and 3 being arranged to face each other, transparent electrode films 4 and 5, which are formed of ITO (Indium-Tin Oxide) or the like, being provided on inner surfaces of the substrates 2 and 3, respectively, alignment layers 6 and 7 being provided on the transparent electrode films 4 and 5, respectively, and a liquid crystal layer 9 being formed of a chiral smectic C phase in which liquid crystal molecules 8 are homogeneously-aligned under influences of the alignment layers 6 and 7. As shown in FIG. 1A, the substrates 2 and 3 are arranged to face each other partially at a predetermined slope angle θ such that a slope region 11 having a slope surface 10 with respect to a section thereof is formed between the substrates 2 and 3. In this configuration, since the liquid crystal molecules 8 are injected in the slope region 11, the liquid crystal layer 9 also has configuration in accordance with the slope region 11. A spacer 12 for securing the slope angle θ between the substrates 2 and 3 is provided at a position where the spacer 12 is not overlapped with an optical path, for instance, at a substrate edge part.

An optical deflecting apparatus 14 comprises the above-mentioned optical deflecting element 1 and a voltage applying part 13 serving as a rectangular voltage source. The voltage applying part 13 applies polarity-inversed voltages between the transparent electrodes 4 and 5 of the optical deflecting element 1 selectively so as to provide an electric field in the liquid crystal layer 9.

In order to make it possible to set a large deflection angle, it is preferable that a refractive index largely vary when alignment of the liquid crystal is switched. For this reason, it is preferable that ferroelectric liquid crystal have characteristics: a large difference Δn between refractive indexes of major and minor axes of the liquid crystal molecules 8, and a large tilt and cone angle of a smectic C phase. Here, the tilt angle means a slope angle of the liquid crystal molecules 8 toward a normal line of the smectic layer, and the cone angle means an alignment switch angle at porality-inversion time of the electric field, which is equal to the twice of the tilt angle.

In order to accurately shift an optical path, it is necessary to form a non-defective homogeneous alignment condition in the ferroelectric liquid crystal layer injected in the slope region 11 between the substrates 2 and 3. For this reason, it is necessary to carefully choose the alignment direction. In general, since ferroelectric liquid crystal of a large cone angle often belongs to a phase transition class, the ferroelectric liquid crystal cannot pass through a smectic A phase. As a result, it is difficult to form a uniform alignment condition in a smectic C phase where a bistable condition can be achieved as mentioned above. Incidentally, it has been attempted to control the alignment condition by aligning the liquid crystal molecules 8 on the substrates 2 and 3 at a cross angle similar to the cone angle of the liquid crystal material as in a surface-stabilized ferroelectric liquid crystal cell for a conventional image displaying element. However, it was impossible to obtain an expected alignment condition. Also, although the liquid crystal molecules 8 were aligned in any direction toward the slope surface 10, it was impossible to improve the defective alignment condition.

As shown in FIG. 1B, the liquid crystal molecules 8 are aligned in the ferroelectric liquid crystal layer 9 so as to achieve a single-stable condition, that is, a condition where a stable condition and an unstable condition coexist rather than the bistable condition. In the single-stable condition, it is possible to easily obtain a uniform alignment condition in comparison with the case where the liquid crystal molecules 8 are aligned so as to achieve a bistable condition.

In order to provide the optical path deflecting element 1 with such a single-stable condition, a fabrication process of the optical path deflecting element 1 includes the following alignment process for forming a homogeneous alignment in the single stable condition. In a cooling process from an isotropic phase or a cholesteric phase, a voltage is applied between the transparent electrode films 4 and 5 of the optical path deflecting element 1 in a state where decreasing speed of the temperature is appropriately controlled so as to provide an electric field of a predetermined polarity. As a result, since the alignment direction of the smectic layer is determined so that the entire liquid crystal layer 9 can have a same spontaneous polarization direction through an influence on a dipole such as a carbonyl group of the liquid crystal molecules 8 by the electric field, it is possible to form a uniform homogeneous alignment condition.

Here, the single-stable homogeneous alignment is formed such that the major axis of the liquid crystal molecule 8 (liquid crystal director) is approximately along the alignment process direction (rubbing direction). This direction is a direction in the stable condition. If an electric field is applied at the same polarity as time of no electric field or at cell fabrication time, the liquid crystal director is aligned in the stable condition direction. On the other hand, when the polarity of the electric field is switched by polarity inversion of the voltage applied between the transparent electrodes 4 and 5, the liquid crystal director changes the direction thereof. This direction is a direction in the unstable condition because the direction is not equal to the alignment direction. Thus, the unstable condition direction is a direction in which the major axis of the liquid crystal molecules 8 is aligned in accordance with a voltage applied between the transparent electrodes 4 and 5. If the electric field is inversed to the same polarity direction as the time of no electric field or the cell fabrication time, the unstable condition direction is switched to the stable condition direction. Thus, it is possible to switch between the stable condition direction and the unstable condition direction by switching the polarity of the electric field as shown in FIG. 1B. Also, it is possible to alternate the stable condition direction and the unstable condition direction by changing the rubbing direction at the cell fabrication time.

Meanwhile, in order to shift an optical path by switching the liquid crystal director to the two directions (the stable condition direction and the unstable condition direction), it is necessary to set the directions such that one of the directions becomes asymmetry to the other with respect to a polarization direction of a linear polarization of incident light.

Figure 2A:
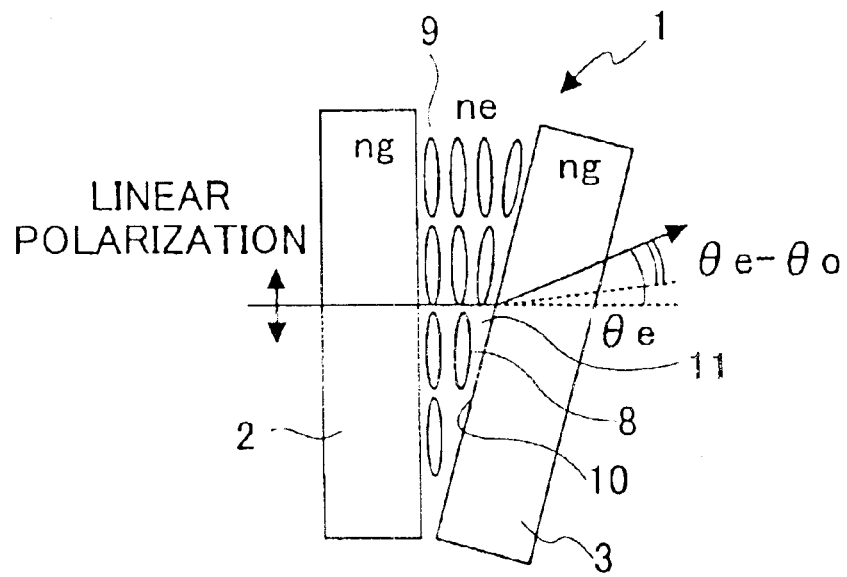
FIGS. 2A and 2B are diagrams for explaining deflection through variations of a refractive index on a slope surface.
Figure 2B:
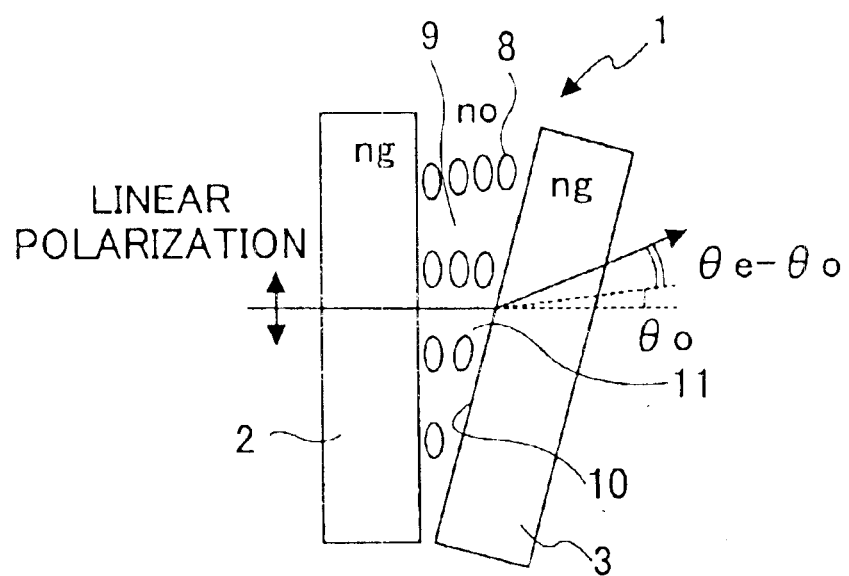

A description will now be given, with reference to FIG. 2A and FIG. 2B, of deflection through variations of the refractive index of the liquid crystal layer on the slope surface 10. It is supposed that the liquid crystal molecules 8 have the refractive index ne with respect to the major direction thereof and the refractive index no with respect to the minor direction thereof. In this case, incident linear polarization is deflected in accordance with an effective refractive index difference corresponding to the refractive index ne/no and the liquid crystal director direction. In a case where the major axis of the liquid crystal molecules 8 is comparatively near the polarization direction of the incident light as shown in FIG. 2A, the incident light is highly influenced by the refractive index ne in the liquid crystal layer 9. For this reason, the light is largely deflected on the slope surface 10 between the liquid crystal layer 9 and the substrate 3 and exits in a state where the light is deflected by the angle θe. On the other hand, in a case where the minor axis of the liquid crystal molecules 8 is comparatively near the polarization direction of the incident light as shown in FIG. 2B, the incident light is less influenced by the refractive index no in the liquid crystal layer 9. For this reason, the incident light is slightly deflected on the slope surface 10 between the liquid crystal layer 9 and the substrate 3 and exits in a state where the light is deflected by the angle θo.

A difference θe−θo between the angles in the two cases is defined as a deflection angle. In the first embodiment, a difference between refractive angles of the stable condition direction and the unstable condition direction in an alignment condition is used as the deflection angle. Thus, the refractive index ne or no of the liquid crystal molecule 8 does not necessarily coincide with a refractive index ng of the substrates 2 and 3 or the alignment layers 6 and 7. It is sufficient that the refractive index difference between the stable condition direction and the unstable condition direction in the alignment condition is caused for the polarization direction of the incident linear polarization. In other words, in a case where a position of the incident linear polarization is considered as the center axis, if the stable condition direction and the unstable condition direction are provided at the position symmetric to the center axis, it is impossible to generate the refractive index difference by alternating the two directions in order to shift an optical path.

Figure 3:
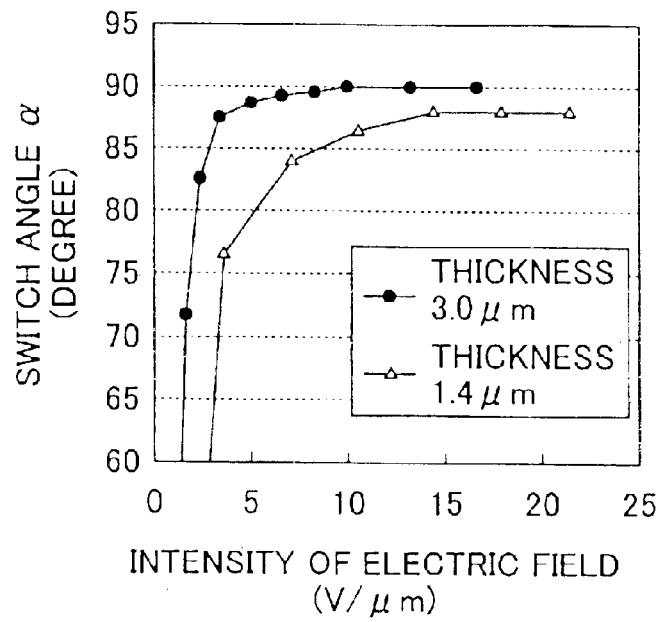
FIG. 3 is a characteristic diagram illustrating a relation between intensity of an electric field and a switch angle $\alpha$ with respect to given thicknesses of a liquid crystal layer.
Figure 4:
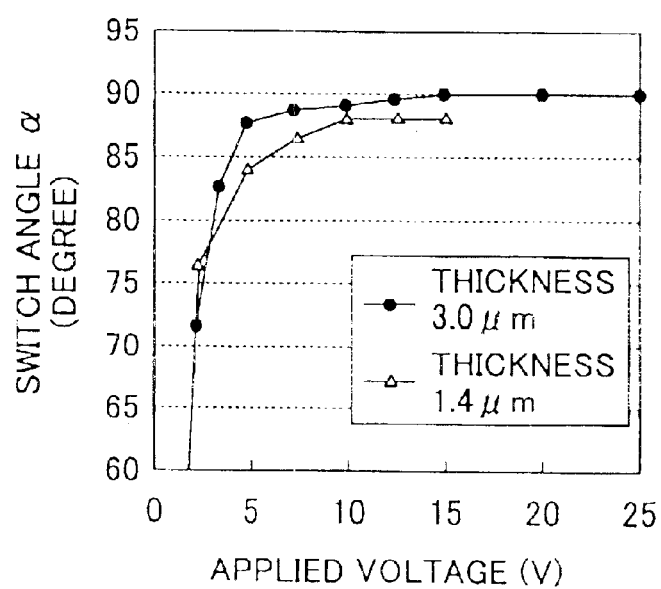
FIG. 4 is a characteristic diagram illustrating a relation between an applied voltage and a switch angle $\alpha$ with respect to the given thicknesses of the liquid crystal layer.

A description will now be given, with reference to FIG. 3 and FIG. 4, of a switch angle of the liquid crystal director direction. As shown in FIG. 3, as applied intensity of an electric field increases, the switch angle increases and then reaches a peak at an angle. In FIG. 3, liquid crystal of the large cone angle is used to compare two cases (thicknesses of 3.0 μm and 1.4 μm) regarding thickness of the liquid crystal layer 9. In the case where the liquid crystal layer 9 has the greater thickness (3.0 μm), the switch angle reaches the peak at comparatively low intensity of the electric field. On the other hand, in the case where the liquid crystal layer 9 has the smaller thickness (1.4 μm), alignment regulation is highly influenced. As a result, the electric field needs to have larger intensity to achieve the peak and the switch angle becomes smaller.

In the optical path deflecting element 1, however, as the liquid crystal layer 9 becomes thinner, a distance between the transparent electrodes 4 and 5 becomes shorter and larger intensity of the electric field is applied to a thinner portion of the liquid crystal layer 9 as shown in FIG. 1A. Thus, the switch angle α actually can have a smaller difference with respect to the thickness of the liquid crystal layer 9 for a voltage applied between the transparent electrodes 4 and 5 as shown in FIG. 4. In an example shown in FIG. 4, it is preferable to apply a voltage between about 20 V and 30 V at which the switch angle α reaches the peak. At this time, although the switch angle α varies depending on the thickness of the liquid crystal layer 9, the switch angle α does not have to be perfectly unique. The switch angle α may include a difference of a few degrees in practice.

In order to obtain a large deflection angle, since the optical path deflecting element 1 has a large slope angle θ between the substrates 2 and 3, the liquid crystal layer 9 has a larger difference between a thick portion and a thin portion therein. In general, when the liquid crystal layer 9 has a great thickness in the slope region 11, regulation power of an alignment process is weaken in a middle portion of the liquid crystal layer 9, and the liquid crystal molecules 8 is likely to be in a defective alignment condition. Even if an initial alignment condition has no problem, there is a probability that continuous use causes reliability deterioration. However, the optical path deflecting element 1 can maintain an alignment condition by always applying an electric field without a memory property unlike a surface-stabilized ferroelectric liquid crystal cell. As a result, it is possible to provide a comparatively greater thickness to the liquid crystal layer 9 than the surface-stabilized cell, which is favorable to the design of the optical path deflecting element 1.

Furthermore, although the appropriate thickness of the liquid crystal layer 9 depends on characteristic values such as a helical pitch of a ferroelectric liquid crystal material, it is preferable that the thickness be set between 0.5 μm and 20 μm. If there is a portion of the thickness beyond the upper bound of 20 μm, there is a probability that white turbidity arises in liquid crystal in the thick portion. If there is a portion of the thickness of less than the lower bound of 0.5 μm, there is a probability that the switch angle α decreases because of the strong alignment regulation power. It is more preferable to set the thickness as between 1 μm, which is a thickness for easily forming a gap between the substrates 2 and 3, and the helical pitch of the chiral smectic C phase. When the thickness is set as less than the helical pitch of the chiral smectic C phase, it is possible to improve the alignment stability and increase the response speed similarly to the surface-stabilized ferroelectric liquid crystal cell.

Figure 5A:
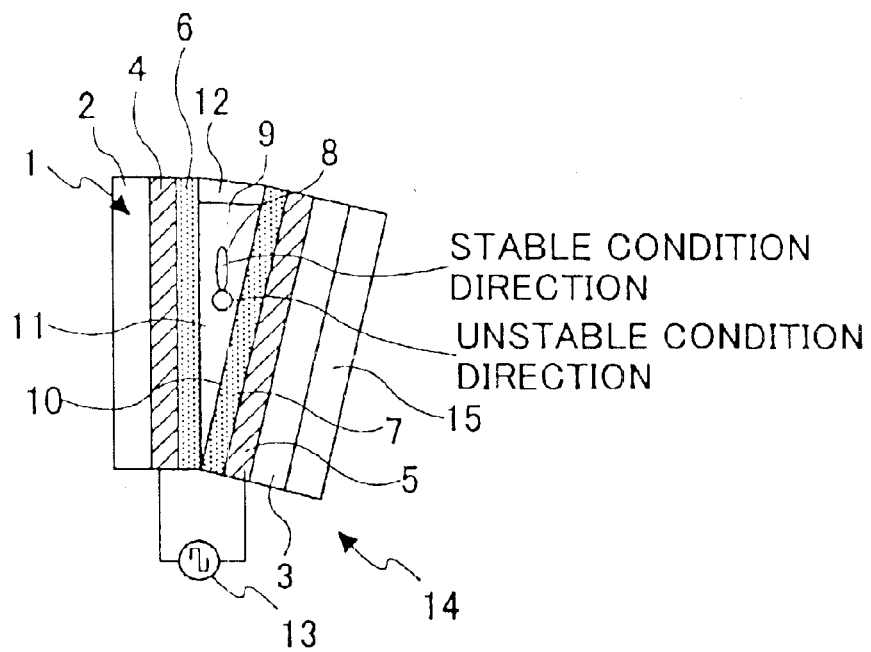
FIGS. 5A and 5B are a sectional view with respect to an A—A line and a front view, respectively, of the optical path deflecting element and the optical path deflecting apparatus according to the first embodiment together with illustration of a slope direction and an alignment direction in a slope region.
Figure 5B:
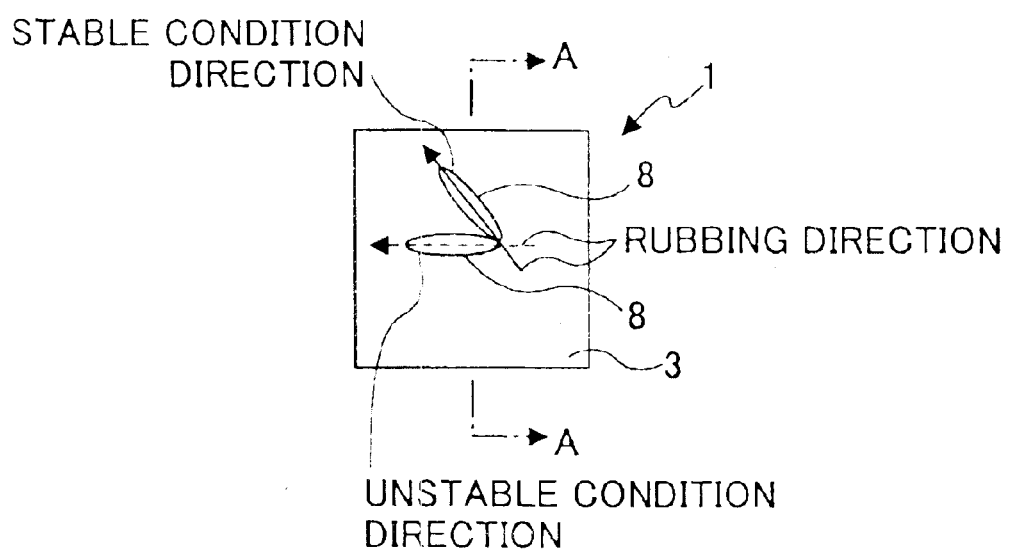

Meanwhile, although a single-stable homogeneous alignment direction may have any direction, it is preferable that the unstable condition direction of the liquid crystal molecules 8 (or the stable condition direction if the rubbing direction is dot lines in FIG. 5B) be aligned in a direction perpendicular to the slope direction, which is considered as a stable position in the slope region 11, as shown in FIG. 5B. The alignment direction can be easily determined depending on the cone angle of a liquid crystal material in use.

As shown in FIG. 5A, the optical path deflecting element 1 is formed such that the unstable condition direction (or the stable condition direction) of the liquid crystal molecules 8 becomes perpendicular to the slope direction of the slope surface 10 of the substrate 3. In order to deflect an optical path by the optical path deflecting element more efficiently, it is preferable that a direction of incident linear polarization coincides with the stable condition direction or the unstable condition direction of homogeneous alignment. When the major axis direction of the liquid crystal molecules 8 coincides with the polarization direction of the linear polarization under such arrangement, it is possible to improve optical utilization efficiency and make the optical path deflecting element 1 highly efficient.

Even if the optical path deflecting element 1 has either of the structures shown in FIG. 1 and FIG. 5, a noise ray component is caused in a case where the major axis direction of the liquid crystal molecules 8 is not located horizontally (parallel) or vertically (orthogonally) to the polarization direction of the incident light, that is, in a case where the liquid crystal molecules 8 does not have the cone angle of 90° and the linear polarization enters obliquely toward the stable condition direction and the unstable condition direction. Also, such a noise ray has a rotated polarization surface. In order to remove the noise ray, a polarization plate 15 is provided in the side of the exit light as shown in FIG. 1A and FIG. 5A. In this configuration, it is possible to remove the noise ray component and reliably shift an optical path. Thus, it is possible to provide the optical path deflecting element that can operate more accurately.

A description will now be given, with reference to FIG. 6 and FIG. 7, of an optical path deflecting element and an optical path deflecting apparatus according to the second embodiment of the present invention wherein the same parts as those in the first embodiment are designated by the same reference numerals and the description thereof is omitted.

In the first embodiment, the optical path deflecting element 1 has been described in terms of the alignment processing method for providing an optical path deflecting function to a ferroelectric liquid crystal cell and the linear polarization direction of incident light. An optical path deflecting element 21 according to the second embodiment is intended to make efficient use of the refractive index difference between the major and the minor axes of the liquid crystal molecules 8.

Figure 6:
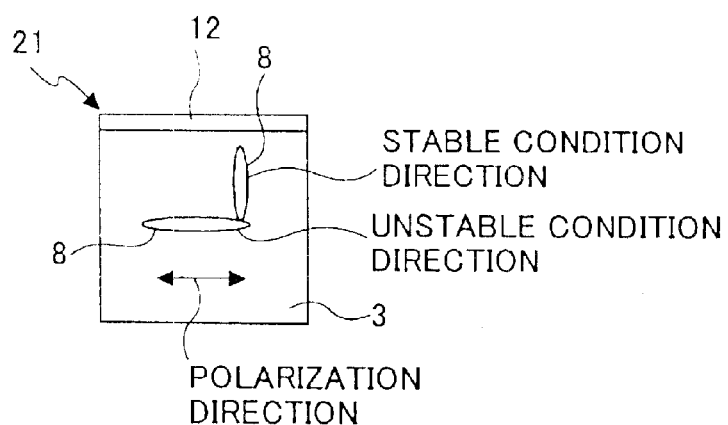
FIG. 6 is a front view of an optical path deflecting element and an optical path deflecting apparatus according to a second embodiment of the present invention.
Figure 7:
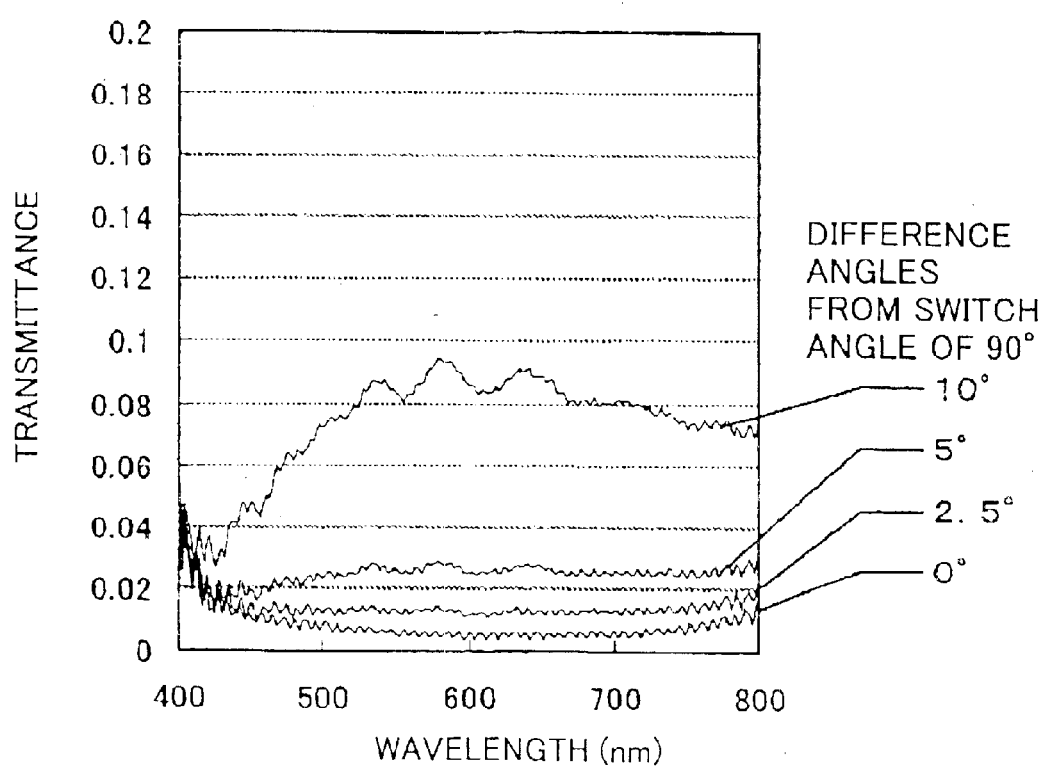
FIG. 7 is a characteristic diagram illustrating a relation between wavelength and transmittance with respect to given difference angles from a switch angle of 90°.

Although the optical path deflecting element 21 fundamentally has the liquid crystal cell structure as shown in FIG. 1A, ferroelectric liquid crystal having a cone angle of approximately 90° is injected between the substrates 2 and 3 such that the ferroelectric liquid crystal is aligned to have alignment directions of a stable condition direction and an unstable alignment direction as shown in FIG. 6. FIG. 6 is a front view of the liquid crystal layer 9 in the optical path deflecting element 21 from the incident light side. The polarization direction of the incident linear polarization is set to coincide with the unstable condition direction in single-stable homogeneous alignment.

In this configuration, when the voltage applying part 13 applies a voltage between the transparent electrodes 4 and 5 so that the major axis of the liquid crystal molecules 8 can be directed in the unstable condition direction by a generated electric field, the incident light is transmitted in a state where the light has an exit angle corresponding to a refractive index ne with respect to an extraordinary light. On the other hand, when a polarity of the voltage applied by the voltage applying part 13 is inverted so that the major axis of the liquid crystal molecules 8 is directed to the stable condition direction by the inversed electric field, the linear polarization propagating in the inclined liquid crystal molecules 8 along the slope region 11 is transmitted in a state where the light has an exit angle corresponding to a refractive index no with respect to an ordinary light. A difference between these exit angles becomes a deflection angle. In this case, since the optical path deflecting element 21 makes the most use of birefringence of the liquid crystal molecules 8 therein, it is possible to obtain the highly efficient optical path deflecting element 21 that improves optical utilization efficiency.

A description will now be given of a permissible range of the switch angle α between the two directions (the stable condition direction and the unstable condition direction). In order to make the most use of the difference of the refractive indexes between the major and the minor axes of the liquid crystal molecules 8, it is preferable that the switch angle α be 90° in the liquid crystal having a cone angle of 90°. In fact, as mentioned in FIG. 2, the switch angle α is often smaller than the preferable angle by a few degrees in a thin portion of the liquid crystal layer 9. Moreover, as a temperature increases, the switch angle α tends to be smaller. When the switch angle α becomes smaller than 90°, non-polarized light components become noise rays and a ratio S/N (Signal/Noise) is decreased. Since polarization surfaces of such noise rays are rotated, it is possible to find a relation between a difference angle from an ideal alignment direction and a quantity of the noise ray by measuring a light quantity transmitted in the polarization plate.

The above-mentioned single-stable homeotropic-aligned ferroelectric liquid crystal cell is sandwiched between two polarization plates that are arranged orthogonally to each other. A state where the liquid crystal alignment direction thereof is identical to the polarization direction of one of the polarization plates is supposed as 0°. FIG. 7 shows variations of the transmittance with respect to given difference angles from the switch angle of 90°. In FIG. 7, if a value on the vertical axis is centuplicated, the resulting value is interpreted in percentage terms. The transmittance increases proportionately to a leaked ray, that is, the above-mentioned noise light quantity. Here, the optical path deflecting element 21 uses the liquid crystal layer 9 of 3 μm in thickness. Even if the difference angle is 0°, a small quantity of the leaked ray is observed as shown in FIG. 7. It is guessed that the leaked ray is caused by nonuniformity of the alignment direction and characteristics of the polarization plates. As long as the difference angle is less than 5°, the transmittance becomes less than 3% and has little wavelength dependency. In this range, it is considered that the optical path deflecting element 21 performs satisfactorily in practice. However, if the difference angle reaches 10°, a noise ray is generated and the transmittance increases by nearly 10%. Therefore, if the difference angle is less than 5°, that is, the switch angle between the alignment directions falls in a range of 90°±5°, this angle range can be supposed as 90° with no trouble in practice. Here, it is noted that the angle range is not limited to the value range 90°±5°.

Furthermore, according to the optical path deflecting element 21, since the a polarization of light propagating in the liquid crystal layer 9 is not rotated, it is unnecessary to provide the polarization plate 15 for removing an exit extraordinary ray.

Furthermore, even if the stable condition direction and the unstable condition direction are arranged at any angle toward the slope region 11, it is possible to obtain the efficient optical path deflecting element 21. In order to achieve more stable operation of the optical path deflecting element 21, however, it is preferable that one alignment direction of the liquid crystal molecules 8, for instance, the unstable condition direction, be arranged perpendicularly to the stable slope direction of the slope region 11.

A description will now be given, with reference to FIG. 8 through FIG. 10, of an optical path deflecting element and an optical path deflecting apparatus according to the third embodiment of the present invention wherein the same parts as those in the above-mentioned embodiments are designated by the same reference numerals and the description thereof is omitted. An optical path deflecting element 31 according to the third embodiment can deflect an optical path in a wider area.

Such a wide-area optical path deflecting element is fundamentally manufactured similarly to the above-mentioned embodiments. However, as an optical path can be deflected in a wider area, the liquid crystal layer becomes thicker in the mouth side of the slope region 11.

In order to overcome the above-mentioned problem, a periodic structure 32 having a saw-toothed section is provided to one of the pair of substrates 2 and 3 facing each other, in this case, the facing surface of the substrate 3. In this configuration, it is possible to divide the slope surface 10 in the slope region 11 by a plurality of slope lines 32a of the saw-toothed periodic structure 32. When the slope surface 10 in the slope region 11 is divided by the slope lines 32a of the saw-toothed periodic structure 32 it is possible to form a slope surface that can be considered to be continuous in terms of broad perspective in a limited thickness of the optical path deflecting element. For simplicity, the transparent electrode films and the alignment layer are omitted in FIG. 8A. An alignment layer is provided in inner sides of the substrates 2 and 3. A rubbing process is conducted for the alignment layer in the direction shown in FIG. 8B so as to set the stable condition direction of the liquid crystal molecules 8 as a direction perpendicular to the slope direction of the saw-toothed periodic structure 32. The spacer 12 controls the liquid crystal layer 9 so that the liquid crystal layer 9 can have a thickness of at most less than 20 $\mu$m. In order to obtain the optical path deflecting element 31 without defective alignment, it is preferable that the saw-toothed periodic structure 32 be formed so that a thickness difference in the liquid crystal layer 9 can be less than 5 $\mu$m. The saw-toothed periodic structure 32 can be formed through an etching process for a glass substrate or an injection molding process for a transparent plastic material. When the saw-toothed periodic structure 32 is used in the optical path deflecting element 31 to form the continuous slope region 11 in terms of broad perspective, the optical path deflecting element 31 is capable of deflecting an optical path in a wider area.

In order to fabricate the optical path deflecting element 31 including the saw-toothed periodic structure 32, liquid crystal is injected along the saw-toothed periodic structure 32 as mentioned later. As a result, since the liquid crystal can be efficiently injected, it is possible to shorten the injection time and decrease an unnecessary excessive amount of the liquid crystal.

Here, the optical path deflecting element 31 fundamentally performs optical deflection as mentioned in FIG. 2, that is, an optical path is, deflected through refraction on a slope interface by changing a refractive index of liquid crystal molecules. Besides the deflection through refraction, the optical path deflecting element 31 can deflect the optical path through diffraction by the saw-toothed periodic structure 32.

Since the optical path deflecting element 31 has the saw-toothed periodic structure 32 on the substrate 3, the optical path deflecting element 31 may deflect an optical path through diffraction.

A description will now be given, with reference to FIGS. 9A and 9B, of optical path deflection using diffraction.

In the optical path deflection through diffraction, an optical path is deflected by changing a refractive index of liquid crystal molecules similarly to the optical path deflection through refraction. In this case, a deflection angle depends on a pitch of the saw-toothed periodic structure 32, and deflected light (diffracted light) efficiency is determined in accordance with three factors: a tooth height of the saw-toothed periodic structure 32, a refractive index of the liquid crystal layer 9, and a refractive index difference of the saw-toothed interface based on scalar theory. Here, wavelength of incident light is notated as $\lambda$, the pitch of the saw-tooth as d, the tooth height as h, the average refractive indexes of the liquid crystal layer 9 as no and ne, and the refractive index of the saw-tooth as ng. If the average refractive index no of the liquid crystal layer 9 coincides with the refractive index ng of the saw-tooth (no=ng), the incident light propagates straight as shown in FIG. 9A with no influence by the saw-toothed periodic structure.

Figures 9A, 9B:
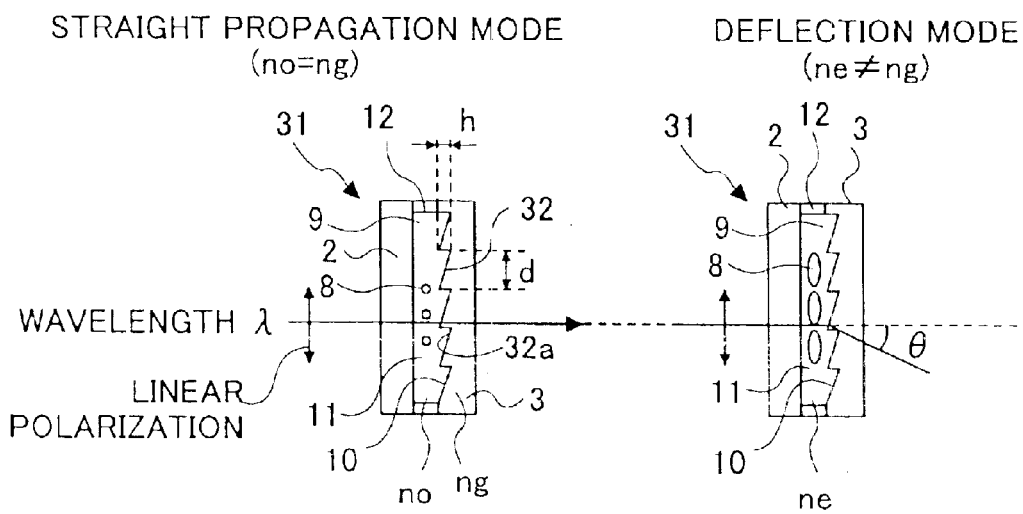
FIGS. 9A and 9B are schematic diagrams in a straight propagation mode and a deflection mode, respectively, of optical path deflection through diffraction by using a saw-toothed periodic structure.

In contrast, if the average refractive index ne of the liquid crystal layer 9 does not coincide with the refractive index ng of the saw-tooth (ne≠ng), the incident light is deflected through diffraction as shown in FIG. 9B with influence by the saw-toothed periodic structure 32. In this case, the deflection angle $\theta$ is computed as follows;

$$\theta=\sin^{-1}(m\cdot\lambda/d).$$

The deflected light efficiency $\eta$ is computed as follows;

$$\eta=\text{sinc}^2((h\cdot\Delta n/\lambda)-m),$$

where m is an order of the diffracted light and $\Delta n$ is a refractive index difference between the saw-toothed interface and the liquid crystal. The order m of the diffracted light is set as an order that can obtain a desired deflection angle. It is preferable that the order m be set as the 1st-order diffracted light (m=1) form the viewpoint of efficiency and design. In this fashion, the optical path deflecting element 31 can deflect the incident light with or without the diffraction (whether or not diffraction is generated) by changing the refractive index of the liquid crystal.

Here, the tooth height h is set from the refractive index difference $\Delta n$ and the wavelength $\lambda$ so as to enhance the diffraction efficiency of the 1st-order diffracted light as follows;

$$h=\lambda/\Delta n.$$

Figure 10:
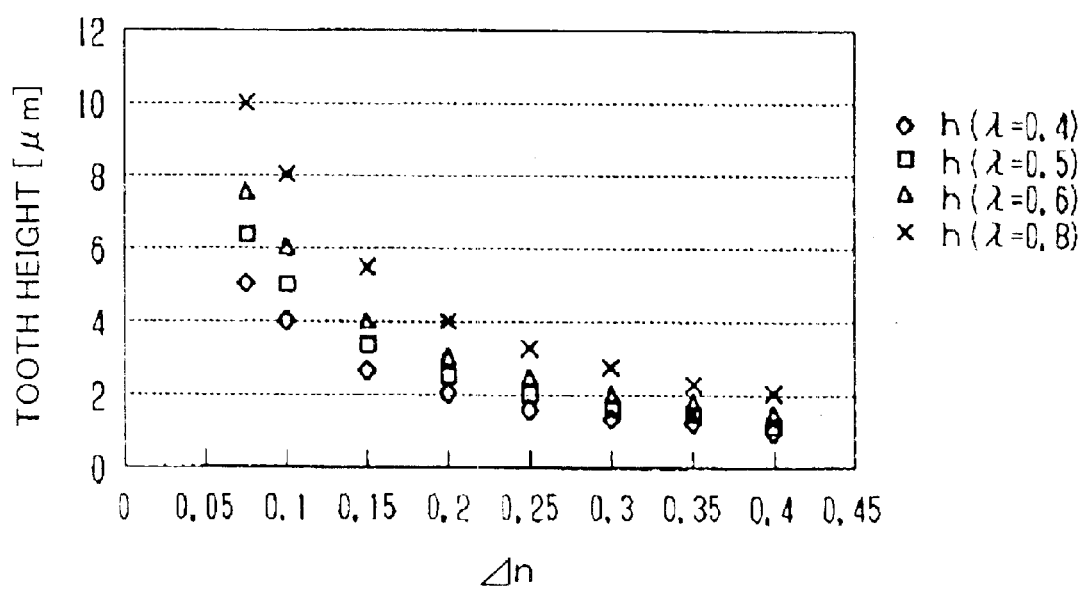
FIG. 10 is a characteristic diagram illustrating optimal tooth heights of the saw-toothed periodic structure with respect to wavelengths.

FIG. 10 shows optimal tooth heights that can improve the diffraction efficiency of the 1st-order diffractive light in ranges of 400 nm$\leq\lambda\leq$800 nm and 0.08$\leq\Delta n\leq$0.4. From FIG. 10, when the tooth height h is set in a range of 1 $\mu$m$\leq$h$\leq$10 $\mu$m, it is possible to achieve the highest diffraction efficiency on the 1st-order diffracted light.

In the optical path deflection through diffraction, if the refractive index of the liquid crystal perfectly coincides with the refractive index of the saw-tooth (no=ng or ne=ng), incident light propagates straight without influence by the saw-toothed periodic structure as mentioned above. However, when the refractive index of the liquid crystal does not perfectly coincide with the refractive index of the saw-tooth, there arise straight light and deflected light. Here, efficiency of the straight light and the deflected light (the 1st-order diffractive light) is examined based on the scalar theory. If the refractive index difference is ±10%, the straight light has the efficiency of about 60% and the deflected light (1st-order diffracted light) has the efficiency of about 20%. If the refractive index difference is ±7%, the straight light has the efficiency of about 80% and the deflected light (1st-order diffracted light) has the efficiency of about 10%. As seen from this result, the refractive index difference not only reduces the efficiency on the straight light but also generates noise light due to the deflected light. In general, it is difficult to make the two refractive indexes of the liquid crystal and the saw-toothed periodic structure perfectly equivalent because of wavelength dispersion of the refractive indexes or the like. In the straight light mode as shown in FIG. 9A, however, the noise light due to the refractive index difference of ±7% rarely gives significant influence in practical use.

In the case where the refractive index of the liquid crystal does not coincide with the refractive index of the saw-toothed periodic structure and incident light is deflected through diffraction with influence by the saw-toothed periodic structure, that is, in the deflected light mode as shown in FIG. 9B, when all or a portion of wavelength of the incident light is set in the range $$0.8 \cdot \Delta n \cdot h \leq \lambda \leq 1.25 \cdot \Delta n \cdot h,$$

it is possible to deflect the wavelength of the incident light in efficiency of more than about 80% and achieve the straight light efficiency of less than about 5% (scalar theory estimation values). Accordingly, when the incident light is deflected, it is possible to suppress a straight light component that appears as the noise light. Thus, the noise light (the straight light) rarely gives significant influence in practical use even in this range.

A description will now be given, with reference to FIG. 11 and FIG. 12, of an optical path deflecting element 41 according to the fourth embodiment of the present invention wherein the same parts as those in the previous embodiments are designated by the same reference numerals and the description thereof is omitted.

The optical path deflecting element 41 is constituted so that incident light can be shifted in parallel. FIG. 11 is a sectional view of the optical path deflecting element 41. As shown in FIG. 11, in the optical path deflecting element 41, the slope region 11 is divided between the substrates 2 and 3 into a first slope region 42 and a second slope region 43, and a transparent middle substrate 44 is provided so that the substrates 2 and 3 can be arranged at a predetermined space. The first and the second slope regions 42 and 43 have a first slope surface 45 and a second slope surface 46, respectively, in the sides of the middle substrate 44. The first and the second slope surfaces 45 and 46 are arranged in parallel to face each other. Liquid crystal layers 47 and 48 are provided in the slope regions 42 and 43, respectively. For simplicity, a transparent electrode film, an alignment layer, a spacer, a power supply, and the like are omitted in FIG. 11. Additionally, the liquid crystal layers 47 and 48 have the same single-stable alignment condition as the above-mentioned embodiments.

In the optical path deflecting element 41, incident light is deflected on the first slope surface 45 in the first slope region 42. Then, the deflected light enters in the second slope region 43 and is deflected again on the second slope surface 46. Since the first and the second slope surfaces 45 and 46 are arranged in parallel, the exit light is emitted in parallel with respect to the incident light. In this fashion, it is possible to conduct parallel shift for the incident light in one direction. Additionally, if the interval between the slope regions 42 and 43 is adjusted by a thickness of the middle substrate 44, it is possible to easily adjust an amount of the parallel shift of the light.

Figure 11:
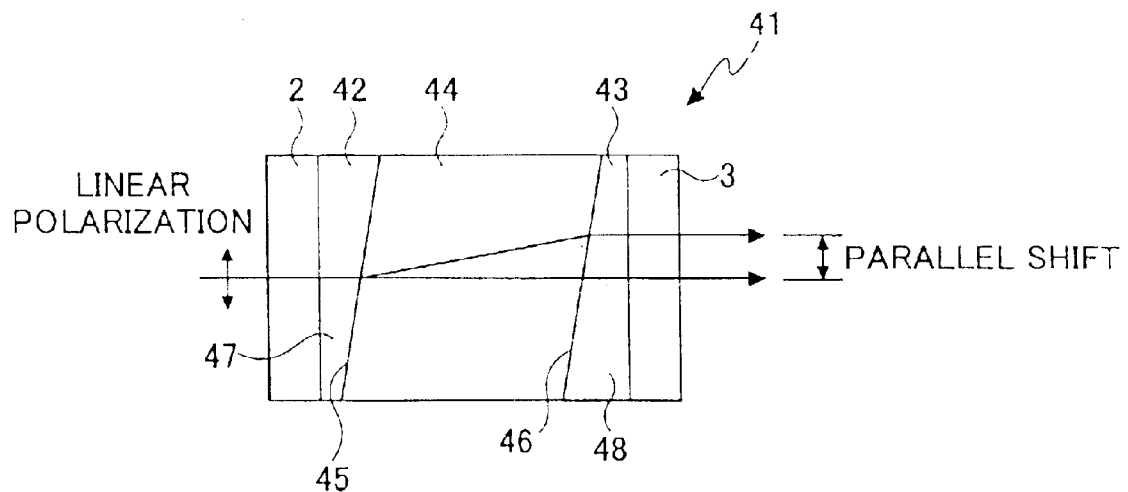
FIG. 11 is a sectional view of an optical path deflecting element according to a fourth embodiment of the present invention.

In FIG. 11, the one middle substrate 44 is used for the two slope regions 42 and 43. However, if two other substrates are prepared instead of the middle substrate 44, two optical path deflecting elements may be constructed to have the slope regions 42 and 43 separately such that the two optical path deflecting elements are arranged at a predetermined interval to face each other.

Figure 8A:
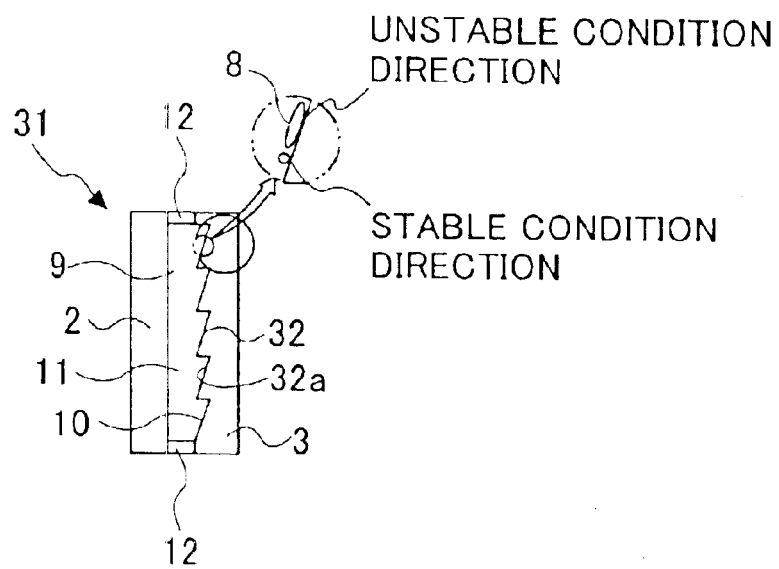
FIGS. 8A and 8B are a sectional view with respect to an A—A line and a front view, respectively, of an optical path deflecting element and an optical path deflecting apparatus according to a third embodiment of the present invention.
Figure 8B:
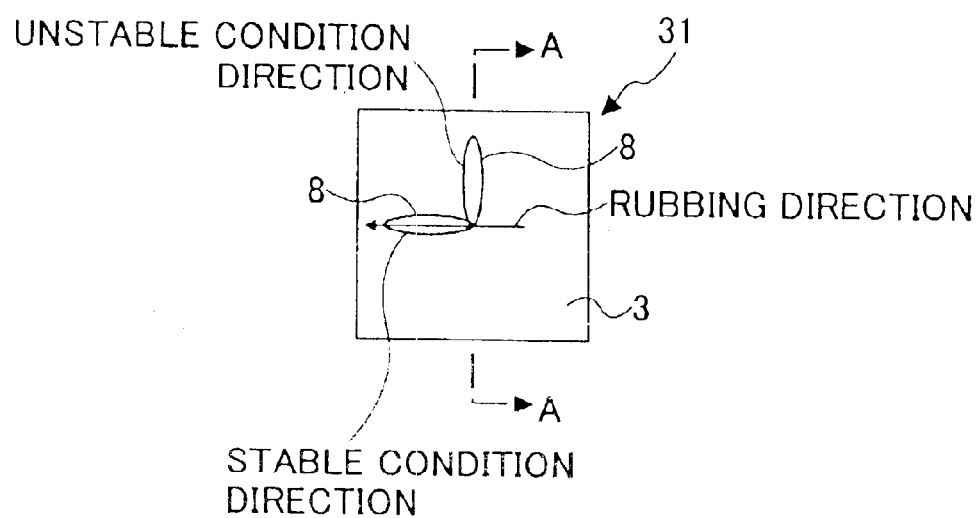
Figure 12:
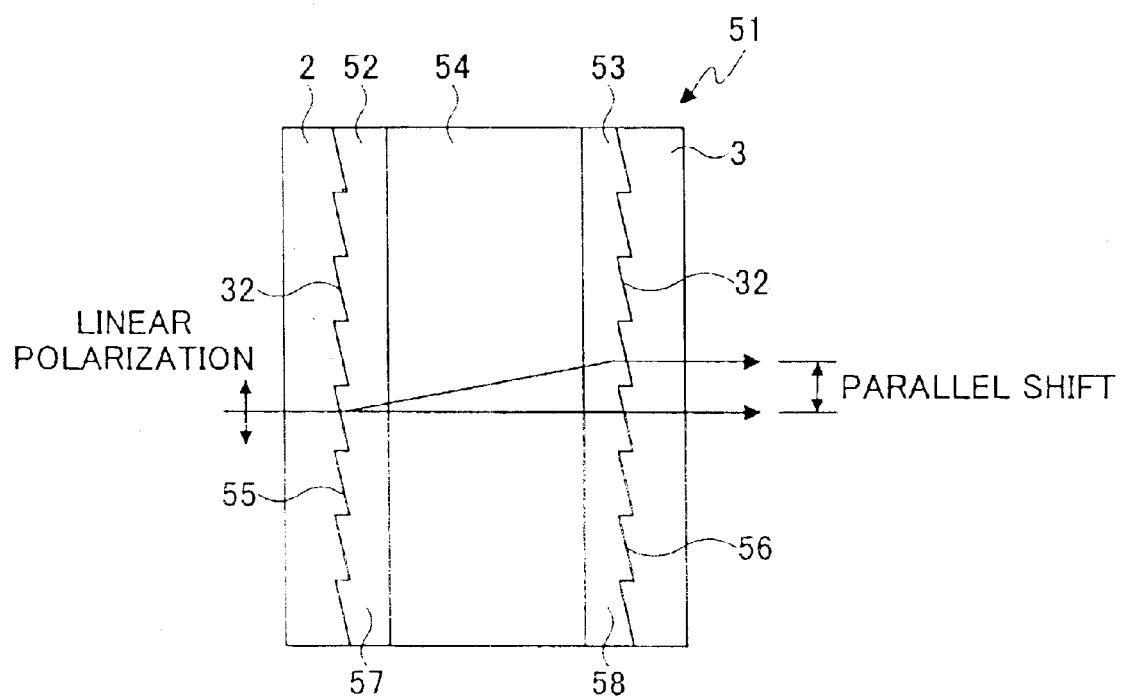
FIG. 12 is a sectional view of a variation of the optical path deflecting element according to the fourth embodiment.

FIG. 12 shows an optical path deflecting element 51 as a variation of the optical path deflecting element 41 that can shift incident light in parallel. The optical path deflecting element 51 uses the saw-toothed periodic structure as shown in FIGS. 8A and 8B to shift the incident light in parallel. As shown in FIG. 12, in the optical path deflecting element 51, the slope region 11 between the substrates 2 and 3 is divided into a first slope region 52 and a second slope region 53. A transparent middle substrate 54 is provided so that the slope regions 52 and 53 can be arranged at a predetermined interval. The slope regions 52 and 53 have a first slope region 55 and a second slope region 56 in the sides of the substrates 2 and 3, respectively. Each of the slope regions 55 and 56 has the saw-toothed periodic structure 32 and is considered to be continuous in terms of broad perspective. The slope regions 55 and 56 are arranged in parallel to face each other. Liquid crystal layers 57 and 58 are provided in the slope regions 52 and 53, respectively. For simplicity, a transparent electrode film, an alignment layer, a spacer, a source supply and the like are omitted in FIG. 12. The liquid crystal layers 57 and 58 have the same single-stable alignment condition as the previous embodiments. When the pair of saw-toothed substrates 2 and 3 are arranged to face each other, it is possible to shift an optical path in parallel in a comparatively wider area.

A description will now be given, with reference to FIG. 13 and FIG. 14, of an optical path deflecting apparatus according to the fifth embodiment of the present invention wherein the same parts as those in the previous embodiment are designated by the same reference numerals and the description thereof is omitted. When only one optical path deflecting element is used in an optical path deflecting apparatus as the above-mentioned embodiments, the optical path deflecting apparatus can deflect an optical path in just one direction. In an optical path deflecting apparatus according to this embodiment, two optical path deflecting elements 61 and 62 are combined. The combined optical path deflecting elements 61 and 62 are mounted to an optical path deflecting apparatus 63. At this time, the optical path deflecting apparatus 63 can deflect (shift) an optical path in two directions orthogonal to each other.

In the optical path deflecting apparatus 63, a first optical path deflecting element 61 and a second optical path deflecting element 62, each of which can shift an optical path in parallel as shown in FIG. 11, are provided in an identical optical path. A polarization direction switching part 64 is provided between the optical path deflecting elements 61 and 62. The first optical path deflecting element 61 shifts incident light in parallel in the Y direction (the vertical direction). On the other hand, the second optical path deflecting element 62 is arranged relative to the first optical path deflecting element 61 such that the maximal slope directions of the slope regions 11 of the optical path deflecting elements 61 and 62 are orthogonal to each other. In this arrangement, the second optical path deflecting element 62 shifts the incident linear polarization in parallel in the X direction (the horizontal direction). The polarization direction switching part 64 rotates exit light from the first optical path deflecting element 61 by 90° and directs the resulting light to the second optical path deflecting element 62. In this fashion, the optical path deflecting apparatus 63 can shift an optical path in the X and Y directions in parallel.

Also, the optical path deflecting apparatus 63 can shift an optical path in the X and Y directions in parallel even without the polarization direction switching part 64. In this case, it is necessary to provide each of the optical path deflecting elements 61 and 62 with a control system for controlling a polarity of a voltage applied to the optical path deflecting elements 61 and 62 and deflection directions thereof. When the optical path deflecting apparatus 63 does not include the polarization direction switching part 64, it is possible to constitute the optical path deflecting apparatus 63 in a simpler structure. As a result, it is possible to reduce fabrication cost of the optical path deflecting apparatus 63. However, when the optical path deflecting apparatus 63 uses the polarization direction switching part 64, the optical path deflecting apparatus 63 has some additional advantages such as noise light inhibition effect and control system sharing effect. For this reason, it is preferable that the polarization direction switching part 64 be provided for the shift of an optical path in the X and Y directions.

Here, although the above description focuses on the parallel shift of an optical path, two-directional angle-based deflection may be conducted by combining two optical path deflecting apparatuses (optical path deflecting elements) that can perform angle deflection.

Figure 13:
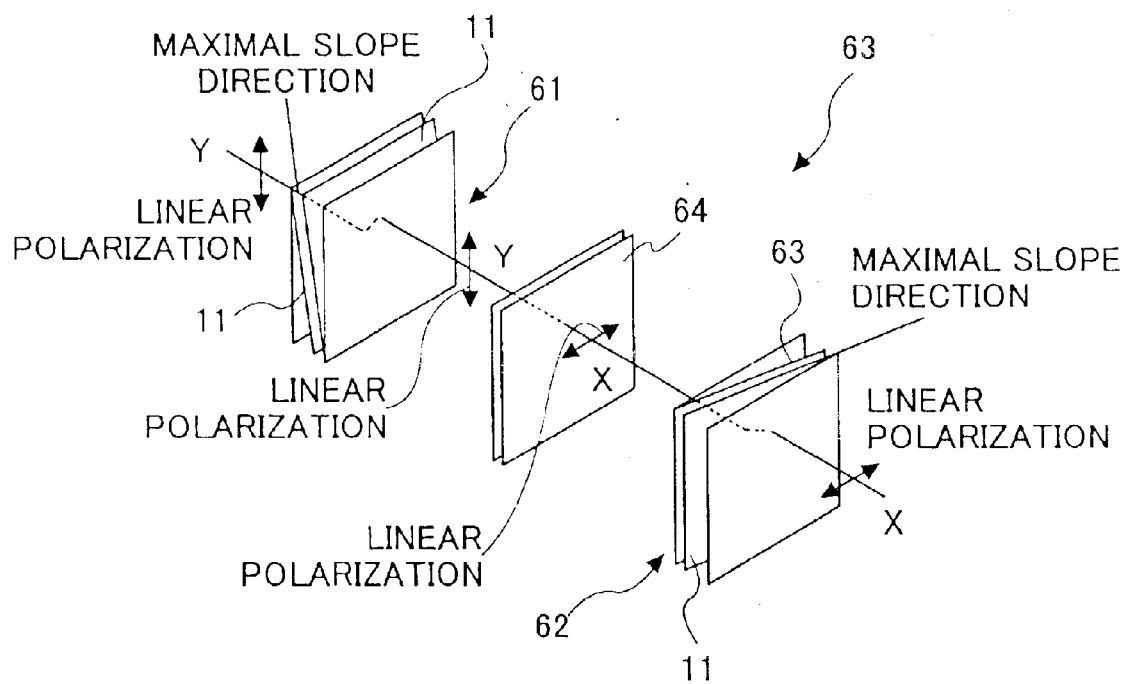
FIG. 13 is a perspective view of an optical path deflecting apparatus according to a fifth embodiment of the present invention.

Also, although the first optical path deflecting element 61, the polarization direction switching part 64 and the second optical path deflecting element 62 are arranged at some intervals in FIG. 13, it is preferable that these elements 61, 64 and 62 be more closely arranged in practice.

A half-wave plate formed of crystal or mica, a twist-nematic (TN) liquid crystal cell, a TN liquid crystal polymer or the like can be used as the polarization direction switching part 64. For instance, if a half-wave plate is used, it is possible to easily constitute the polarization direction switching part 64. In a TN liquid crystal cell, after an alignment layer is formed on a glass substrate, the alignment layer is aligned through rubbing processing and so on. Then, the cells are formed to have alignment directions orthogonal to each other, and nematic liquid crystal is injected therein.

Figure 14:
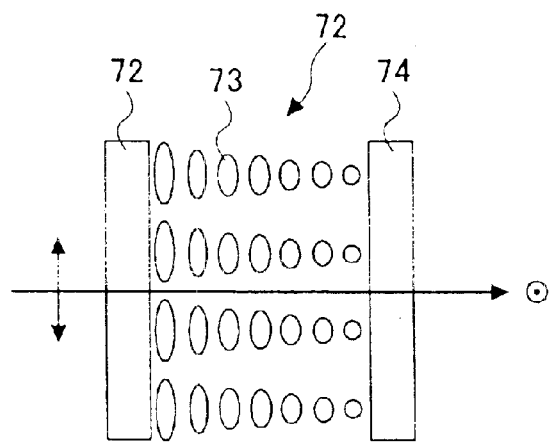
FIG. 14 is a sectional view of a TN liquid crystal cell serving as a polarization direction switch part.

FIG. 14 shows TN liquid crystal cells as the polarization direction switching part 64. As shown in FIG. 14, if the polarization direction switching part 64 is provided such that an alignment direction of an entrance side substrate 71 coincides with a polarization direction of incident light, the incident light is transmitted from liquid crystal 73 in a TN (Twisted Nematic) liquid crystal cell 72 and an exit side substrate 74 as outgoing light whose polarization direction is rotated by 90° with respect to the incident light. In this case, since it is unnecessary to drive an electric field in the TN liquid crystal cell 72, it is possible to constitute the polarization direction switching part 64 in simpler configuration without any transparent electrode. Additionally, if the optical path deflecting element and the TN liquid crystal cell 72 are mounted on a common substrate, it is possible to decrease the number of used substrates and reduce loss of optical utilization efficiency due to interface reflection.

A description will now be given, with reference to FIG. 15 through FIG. 18, of a pixel-shift image displaying apparatus 81 according to the sixth embodiment of the present invention.

Figure 15:
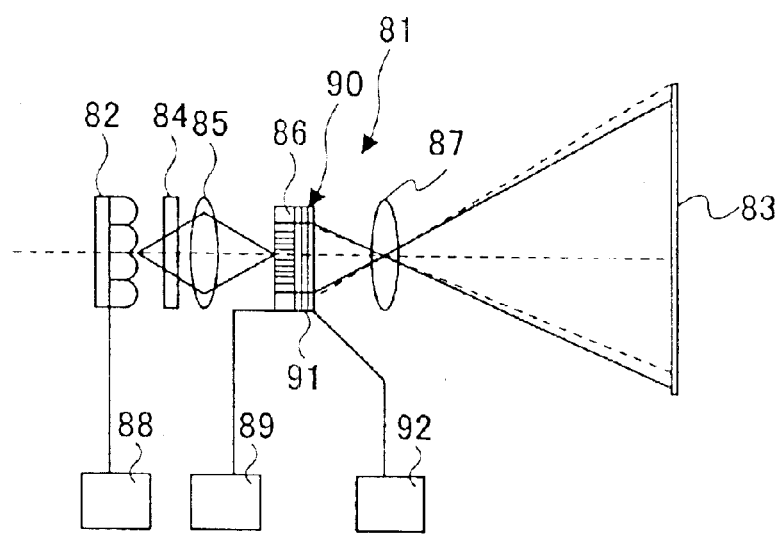
FIG. 15 is a side view of an image displaying apparatus according to a sixth embodiment of the present invention.

FIG. 15 is a side view of the pixel-shift image displaying apparatus 81. As shown in FIG. 15, the pixel-shift image displaying apparatus 81 comprises an illuminant 82, a screen 83, a diffusion plate 84, a condenser lens 85, a transmission liquid crystal panel 86, a projection lens 87, an illuminant driving part 88, a liquid crystal driving part 89, an optical path deflecting apparatus 90 having an optical path deflecting element 91, and a drive control part 92. The illuminant 82, which serves as an illuminant apparatus, is formed by arranging LED (Light Emitting Diode) lumps in a two-dimensional array. Light from the illuminant 82 propagates to the screen 83 via the diffusion plate 84, the condenser lens 85, the transmission liquid crystal panel 86 and the projection lens 87 in this order. The transmission liquid crystal panel 86 serves as an image displaying element. The projection lens 87 serves as an optical apparatus for projecting an image pattern. The illuminant driving part 88 drives the illuminant 82, and the liquid crystal driving part 89 drives the transmission liquid crystal panel 86.

The optical path deflecting element 91 in the optical path deflecting apparatus 90 serves as a pixel shift element, and the optical path deflecting apparatus 90 is provided between the transmission liquid crystal panel 86 and the projection lens 87. The optical path deflecting apparatus according to the previous embodiments is used as the optical path deflecting apparatus 90. The voltage applying part 13 is connected to the optical path deflecting apparatus 90 as the drive control part 92.

Light is emitted from the illuminant 82 under control by the illuminant driving part 88. The diffusion plate 84 makes the emitted light more uniform. Critical illumination is provided to the transmission liquid crystal panel 86 by the condenser lens 85 synchronously with the illuminant 82 under the liquid crystal driving part 89. The light is spatial-light modulated in the transmission liquid crystal panel 86. The modulated light enters the optical path deflecting apparatus 90 as image light. The optical path deflecting apparatus 90 shifts the image light in the array direction of picture elements by an arbitrary distance. The resulting light is magnified by the projection lens 87 and then is projected on the screen 83.

The optical path deflecting apparatus 90 deflects optical paths for a plurality of subfields that are generated through temporal division of an image field. As a result, since an image pattern is displayed in a state where displayed positions vary in accordance with the deflection, it is possible to multiply the number of the apparent picture elements of the transmission liquid crystal panel 86. The optical path shift by the optical path deflecting apparatus 90 apparently duplicates the number of picture elements in the array direction of the picture elements in the transmission liquid crystal panel 86. For this reason, it is appropriate to set the shift amount as a half of a pitch of the picture elements. If an image signal for driving the transmission liquid crystal panel 86 is corrected corresponding to the shift amount, it is possible to display an apparently high-definition image. At this time, since the optical path deflecting apparatus and the optical path deflecting element according to the previous embodiments are used as the optical path deflecting apparatus 90 and the optical path deflecting element 91, it is possible to improve optical utilization efficiency without image degradation due to defective alignment of the liquid crystal and provide a more bright and higher-quality image without load increase of the illuminant 82.

Figure 16:
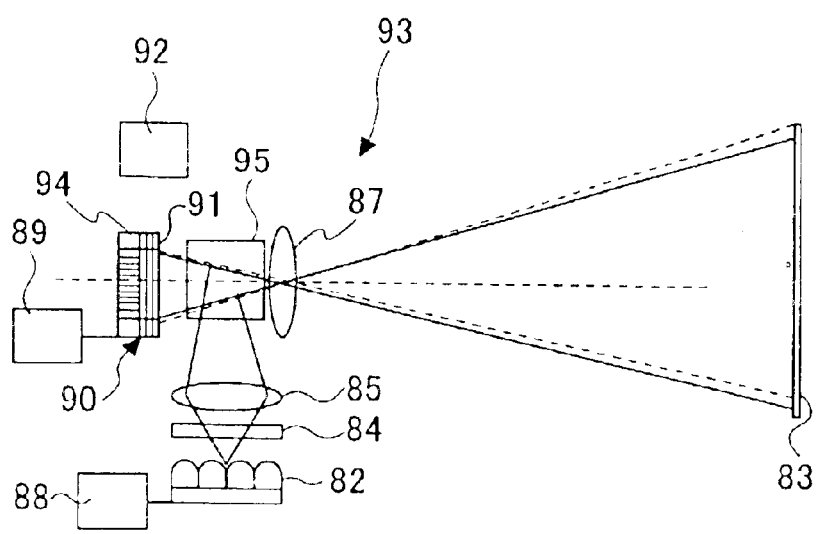
FIG. 16 is a side view of a variation of the image displaying apparatus according to the sixth embodiment.

In the image displaying apparatus 81, the image displaying element is not limited to the transmission liquid crystal panel 86. FIG. 16 shows an image displaying apparatus 93 as a variation of the image displaying apparatus 81 according to this embodiment. As shown in FIG. 16, the image displaying apparatus 93 adopts a reflection liquid crystal panel 94 as the image displaying element thereof. In this case, a polarization beam splitter (PBS) 95 is added to the image displaying apparatus 93. The PBS 95 folds back light from an illuminant system to the reflection liquid crystal panel 94 so as to radiate the light to the reflection liquid crystal panel 94 via the optical path deflecting apparatus 90. The incident light to the reflection liquid crystal panel 94 is reflected on a reflection plate, which is not illustrated in FIG. 16, on the back surface of the reflection liquid crystal panel 94. At the same time, the incident light is spatial-light modulated corresponding to an image and then the modulated light exits as image light. After that, the image light enters the optical path deflecting apparatus 90, and then the optical path deflecting apparatus 90 shifts the image light in the array direction by a predetermined distance. Subsequently, the resulting image light propagates similarly to the above-mentioned case of the transmission liquid crystal panel 86 shown in FIG. 15.

Although the above description focuses on the parallel shift of an optical path, two-directional angle deflection may be conducted by combining two optical path deflecting apparatuses each of which can deflect an optical path by an angle.

When an optical path is deflected in two directions in terms of angles rather than the parallel shift by combining two optical path deflecting apparatuses each of which can deflect the optical path by an angle, it is unnecessary to prepare for a pair of saw-toothed periodic substrates and a middle substrate that are used in the parallel-shift optical path deflecting apparatus. As a result, it is possible to constitute an image displaying apparatus in simpler configuration. Here, a shift amount of an optical path is determined based on an optical path length L between the image displaying element and the optical path deflecting element 91. Thus, if a pitch of the saw-toothed periodic structure of the optical path deflecting element 91 is set in a range;

$$0.9 \cdot (2 \cdot \lambda \cdot L/X) < d < 1.1 \cdot (2 \cdot \lambda \cdot L/X),$$

where X is a pitch of picture elements of the image displaying element, it is possible to shift an optical path of X/2 within a difference of ±10%. It should be noted that λ is the wavelength of all or a portion of the incident light. Although such a difference of the shift amount reduces the contrast, the small difference within ±10% rarely causes serious contrast reduction in practical use.

Figure 17:
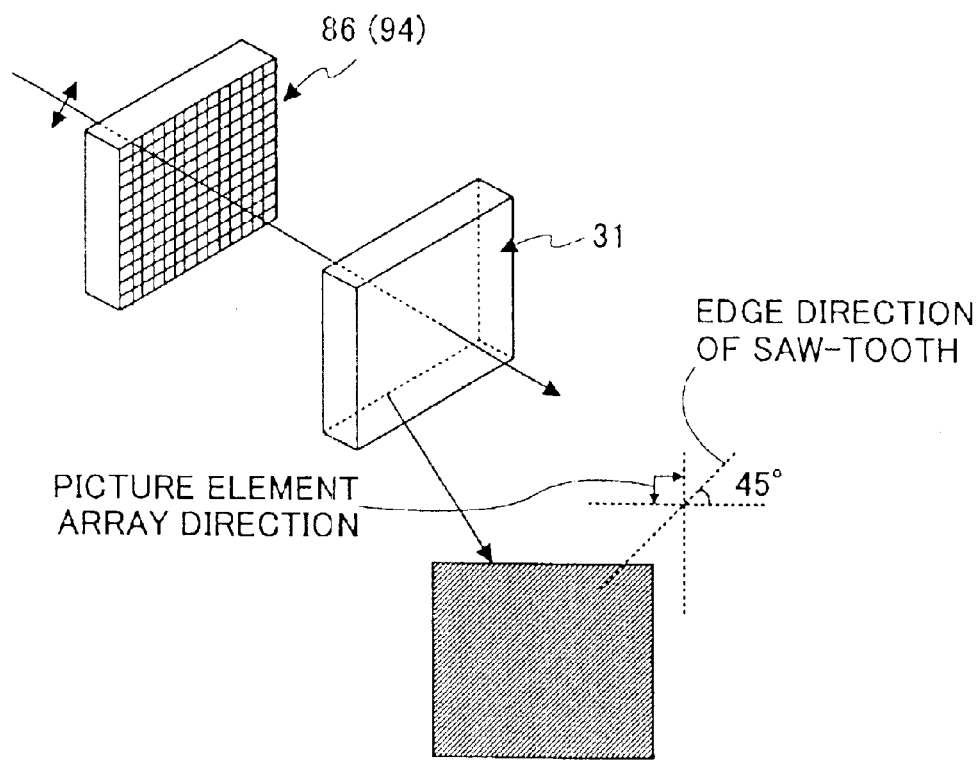
FIG. 17 is a diagram for explaining arrangement of an optical path deflecting element and an image displaying apparatus.

A description will now be given of variations of the pixel-shift image displaying apparatuses 81 and 93. The image displaying apparatus 81, which is constituted in a structure fundamentally similar to that shown in FIG. 15 or FIG. 16, may have only one of the optical path deflecting apparatuses 90 and 91. This selected optical path deflecting apparatus is arranged depending on an array direction of picture elements in the image displaying element 86 or 94. The optical path deflecting apparatus is located such that an optical path is shifted in an oblique direction toward the array direction of the picture elements. As shown in FIG. 17, the optical path deflecting element 31 is arranged such that the edge direction of the saw-tooth of the optical path deflecting element 31 is located in an oblique direction of 45° toward the array direction of the image displaying element 86 or 94.

The above description handles the saw-tooth type optical path deflecting element. However, even if the optical path deflecting element has a simple slope region without the saw-tooth, the optical path deflecting apparatus can be arranged similarly. In this case, the optical path deflecting apparatus is arranged such that an optical path is shifted in an oblique direction toward the array direction of picture elements. An angle of the oblique direction is set in accordance with the picture element array.

Figure 18:
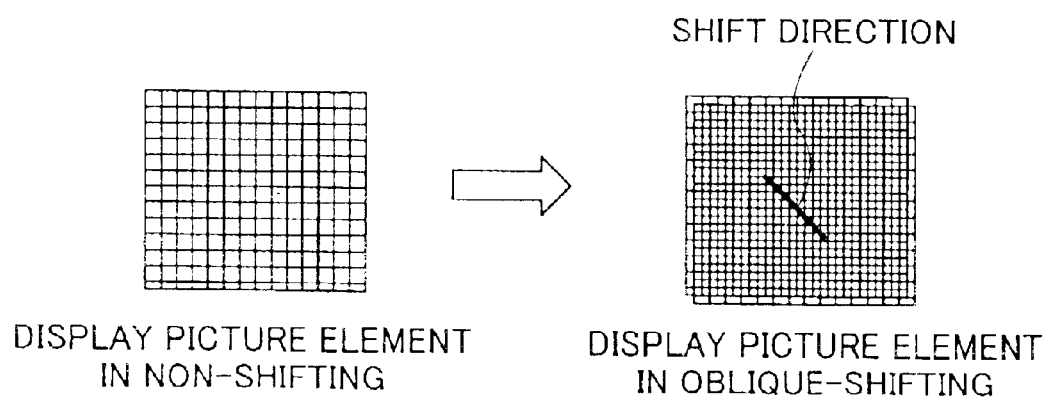
FIG. 18 is a schematic front view of display picture elements in a case of an oblique shift.

FIG. 18 shows an example of display picture elements. In FIG. 18, two-patterns of the display picture elements are illustrated, that is, the display picture element pattern in a case where optical paths are not shifted, and the display picture element pattern in a case where optical paths are shifted in an oblique direction. From FIG. 18, when the optical paths are shifted in the oblique direction, it is observed that a high-resolution display image is obtained similarly to the case where two optical path deflecting elements are used to shift picture elements in the X and Y directions. Namely, when one of the optical path deflecting apparatuses 90 and 91 is arranged such that an optical path is shifted in an oblique direction toward the array direction of picture elements of the image display element 86 or 94, it is possible to display a high-definition image in simple configuration.

In such oblique shift of an optical path, if the optical path deflecting apparatus (the optical path deflecting element 91) is used to deflect an optical path in terms of an angle as mentioned above, it is unnecessary to prepare for the saw-toothed substrate and a middle substrate used for parallel shift. As a result, it is possible to fabricate the high-definition image display apparatus in far simpler configuration. In this case, it is necessary to set the pitch of the saw-tooth of the optical deflecting element 91 in the following range from viewpoints of the contrast or the like;

$$0.9 \cdot (2\sqrt{2} \cdot \lambda \cdot L/X) < d < 1.1 \cdot (2\sqrt{2} \cdot \lambda \cdot L/X).$$

This range can be described similarly to the above description of the angle deflection in which an optical path is not shifted in an oblique direction. Thus, the description thereof is omitted.

A description will now be given, with reference to FIG. 19, of an optical writing apparatus according to the seventh embodiment of the present invention.

Figure 19:
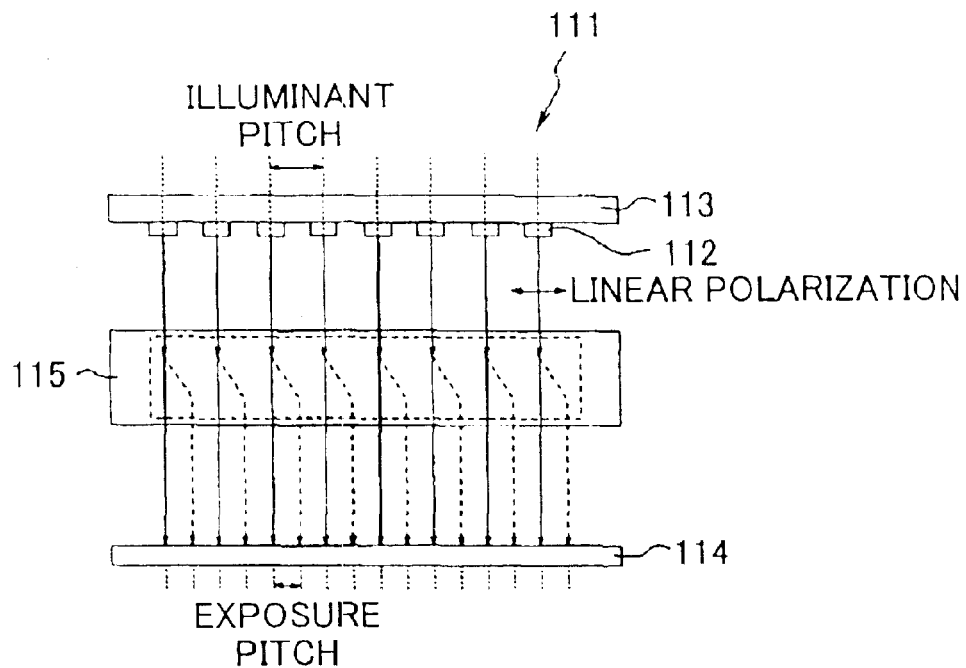
FIG. 19 is a side view of an optical writing apparatus according to a-seventh embodiment of the present invention.

FIG. 19 shows a structure of an optical writing apparatus 111 according to the seventh embodiment. As shown in FIG. 19, the optical writing apparatus 111 comprises an illuminant array 113, a lens, which is not illustrated, and an optical path shift part 115. In the illuminant array 113, a plurality of illuminants (illuminant part) 112 are arranged in a predetermined pitch of picture elements (illuminant pitch). The lens focuses rays from the illuminants 112 on a recording body 114. The optical path shift part 115 electrically shifts the rays from the illuminants 112 in the array direction of the illuminants 112. The above-mentioned optical path deflecting element 91 for shifting an optical path in parallel can be used as the optical path shift part 115. By shifting rays from the illuminants 112 through electric field control for driving the optical path deflecting element 91, the optical writing apparatus 111 can radiate the rays to the recording body 114 in a state where the pitch of picture elements is interpolated.

In the optical writing apparatus 111, the optical path shift part 115 is provided in an optical path between the illuminant array 113 and the recording body 114. The illuminants 112, which are arranged in a predetermined pitch on the illuminant array 113, are driven in accordance with an image signal. The rays from the illuminants 112 are transmitted in the lens and the optical path shift part 115 and then are focused on the recording body 114. As a result, picture elements are exposed on the recording body 114. Here, if the recording body 114 is shifted relative to the illuminant array 113, it is possible to expose two-dimensional image information on the recording body 114.

At this time, the optical path shift part 115 shifts an optical path in the array direction of the illuminants 112. Here, it is supposed that the illuminants 112 are arranged in the array pitch of P μm. If the optical path shift part 115 shifts the optical path by P/2 μm in the array direction at high speed, it is possible to realize an exposure of the twice density of picture elements through interpolation between the picture elements.

In the optical writing apparatus 111, a LED (Light Emitting Diode), a laser diode (semiconductor laser), a combination of an illuminant and a liquid crystal shutter, a combination of an illuminant and a micromirror and the like can be used as the illuminant 112. In order to expose a high-definition image on the recording body 114, it is preferable that the illuminants 112 have a small size and generate rays of high directivity. Since the wavelength of a ray from the illuminant 112 can be designed by selecting an appropriate illuminant material and by using a filter characteristic, the wavelength is adjusted in accordance with spectral sensitivity of the recording body 114 to be exposed. In the illuminant array 113, these illuminants 112 are arranged in one or two dimensional array.

Also, a microlens array may be provided near the illuminant array 113. The microlens array controls a shape of an exposure spot on the recording body 114 by focusing rays from the illuminants 112 and adjusting a luminance distribution of the spot. A liquid crystal microlens array may be used as the microlens array so as to make a size of the exposure spot size variable on the recording body 114 through a variable focal function by controlling an electric field.

A spherical lens, an aspherical lens, a gradient index lens array (selfoc lens array) and the like can be used as the lens for focusing rays from the illuminants 112 on the recording body 114. In order to miniaturize an optical system therein, it is preferable that the gradient index lens array be adopted because the gradient index lens array can shorten an object image distance.

Additionally, a liquid crystal lens may be provided by adding a liquid crystal layer to a portion of the lens in order to obtain a variable exposure spot size on the recording body through the variable focal function by controlling the electric field.

A description will now be given, with reference to FIG. 20 and FIGS. 21A and 21B, of an optical path deflecting apparatus 121 according to the eighth embodiment of the present invention.

Figure 20:
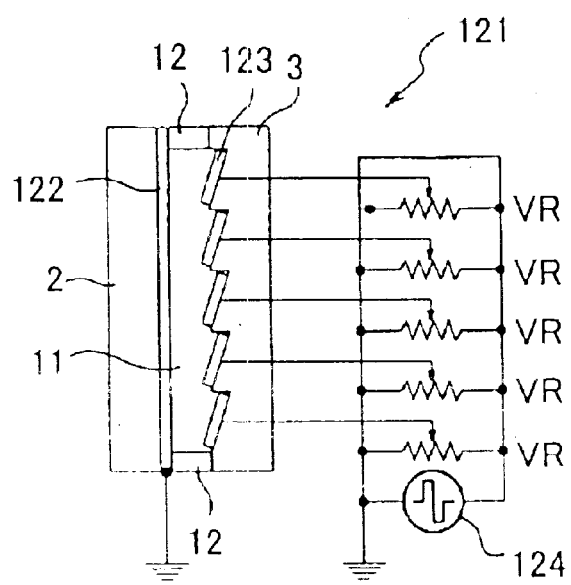
FIG. 20 is a side view of an optical path deflecting apparatus having divided line electrodes according to an eighth embodiment of the present invention.

FIG. 20 shows an optical path deflecting apparatus 121 having divided line electrodes according to the eighth embodiment. Although the optical path deflecting apparatus 121 is constituted in a structure fundamentally similar to the optical path deflecting element 31 shown in FIG. 8A, transparent electrodes 122 and 123 are provided on inner surfaces of the substrates 2 and 3 as shown in FIG. 20 wherein the transparent electrode 123 is divided so as to serve as a plurality of line electrodes corresponding to a pitch of the saw-tooth. The divided line electrodes are provided on only the saw-toothed substrate 3, that is, on only the transparent electrode 123. Although one flat electrode may be provided on the opposite substrate 2 (smoothed substrate) as the transparent electrode 122, it is preferable that divided line electrodes be also provided on the opposite substrate 2. A division number, a pitch and a width of the divided line electrodes are set in accordance with the tooth number, the pitch and the width of the saw-tooth. Additionally, if a variable resistor element VR is provided in each of the divided line electrodes (transparent electrode 123) so as to connect to a power supply 124 as the electric field applying part, it is possible to set intensity of electric fields of the individual divided line electrodes. For simplicity, an alignment layer is omitted in FIG. 20.

The optical path deflecting apparatus 121 can deflect an optical path through refraction and diffraction. As shown in FIG. 21A, if a width of, incident light to the optical path deflecting apparatus 121 is narrower than the width of the saw-tooth, the incident light is deflected through refraction as mentioned with respect to FIG. 2. In such optical path deflection, if each of plural rays, whose individual widths are narrower than the width of the saw-tooth, enters each of teeth of the saw-tooth, it is possible to individually deflect the incident rays by properly setting a resistor value of each of the variable resistor elements VR in the electrodes.

On the other hand, as shown in FIG. 21B, if the width of incident light to the optical path deflecting apparatus 121 is greater than the pitch of the saw-tooth, the incident light is deflected through diffraction as mentioned with respect to FIG. 9. In such optical path deflection, when each of the electrodes in the divided line electrodes has the variable resistor element VR of an appropriate resistor value, it is possible to form a new periodic structure different from the saw-toothed periodic structure. An optical path is deflected in accordance with this new periodic structure. Namely, it is possible to set deflection angles by properly setting the resistor values of the variable resistor elements VR in the divided line electrodes.

Figure 23:
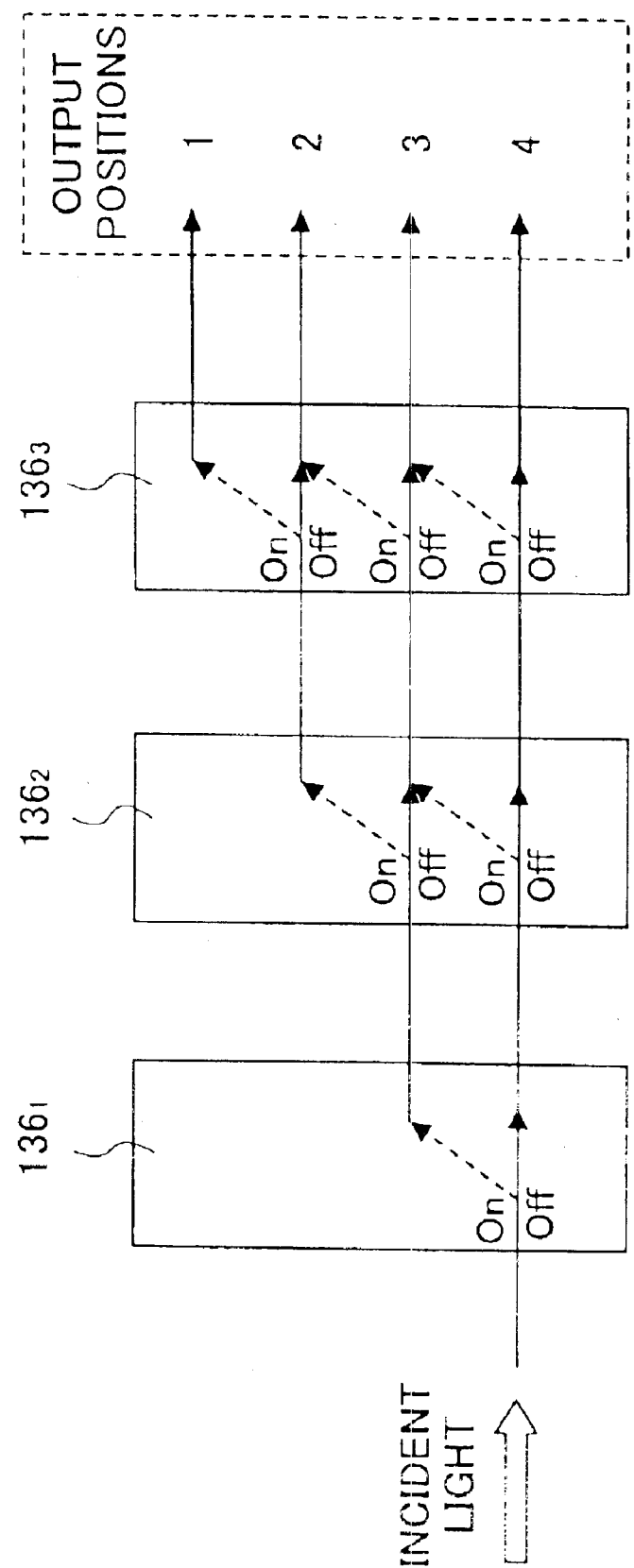
FIG. 23 is a diagram for explaining optical path deflection by the optical path deflecting apparatuses arranged in a cascade fashion.

A description will now be given, with reference to FIG. 22 through FIG. 24, of an optical interconnection apparatus according to the ninth embodiment of the present invention.

FIG. 22 shows a structure of an optical interconnection apparatus 131 according to the ninth embodiment. As shown in FIG. 22, the optical interconnection apparatus 131 comprises an illuminant array 132 for generating an optical beam array, a lens array 133 for focusing the optical beam array, and an optical detector array 135 having a lens array 134 for receiving the optical beam array. Furthermore, optical path deflecting apparatuses $136_1$, $136_2$, ... as shown in FIG. 20 are provided between the illuminant array 132 and the optical detector array 134 in a cascade fashion.

In the optical interconnection apparatus 131, a LED, a laser diode, a surface emitting laser and the like can be used as an illuminant 132a in the illuminant array 131, and a spherical lens, an aspherical lens, a gradient index lens array and the like can be used as the focusing lens array 133. Also, a liquid crystal lens may be provided by adding a liquid crystal layer to a portion of this lens in order to realize a variable spot size through the variable focal function by controlling an electric field. A photodiode and the like can be used as the optical detector 135.

If the optical path deflecting apparatuses $136_1$, $136_2$, ... are selectively driven, it is possible to deliver an optical beam to an arbitrary position. As shown in FIG. 23, for instance, it is supposed that the optical path deflecting apparatuses $136_1$ through $136_3$ are provided in a cascade fashion and are to deflect incident light at the output position 2. In this case, if the optical path deflecting apparatuses $136_1$, $136_2$ and $136_3$ are in ON, ON and OFF, respectively, the incident light arrives at the output position 2. Furthermore, the incident light can arrive at the output position 2 through other combinations of ON/OFF conditions of the optical path deflecting apparatuses $136_1$, $136_2$ and $136_3$. For instance, if the optical path deflecting apparatuses $136_1$, $136_2$ and $136_3$ are in OFF, ON and ON, respectively, the incident light arrives at the output position 2. In this fashion, the optical interconnection apparatus 131 can deliver the incident light to an arbitrary position by selectively driving the optical path deflecting apparatuses $136_1$, $136_2$ and $136_3$.

Furthermore, if the optical path deflecting apparatuses $136_1$, $136_2$, ... are arranged so that an optical path can be deflected in the X and Y directions, it is possible to realize optical wiring in the two-dimensional direction. As a result, such configuration is applicable to board-board optical interconnections.

Figure 24:
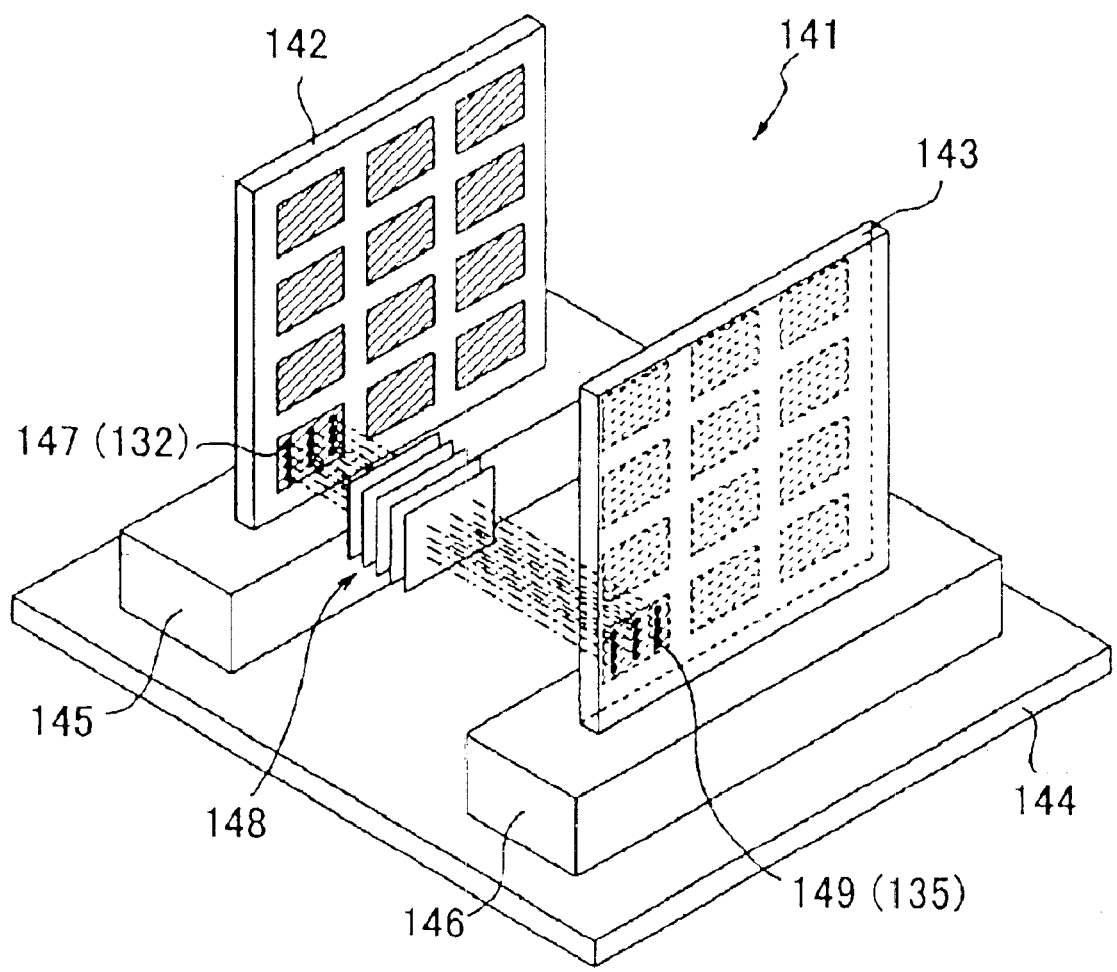
FIG. 24 is a perspective view of a board-board optical interconnection apparatus according to the ninth embodiment.

FIG. 24 shows a board-board optical interconnection apparatus 141. In the board-board optical interconnection apparatus 141, boards 142 and 143 are inserted and fixed in slots 145 and 146, respectively, on a backplane substrate 144 as shown in FIG. 24. Here, a surface emitting laser array 147 is used as the illuminant array 132. A result electrically processed by an LSI (Large-Scale Integration) on the board 142 is converted into light by modulating each laser at high speed. Here, it is preferable that a surface emitting laser for detecting a position is provided in order to secure position accuracy.

Light from the surface emitting laser array 147 is supplied to an optical path deflecting apparatus 148, which corresponds to the optical path deflecting apparatus 136, via a microlens array, which is not illustrated, having a light focusing function. Polarizations of rays from the surface emitting laser array 147 have a uniform direction. If the optical path deflecting apparatuses 48, which are provided in a cascade fashion, for deflecting the rays in the X and Y directions are electrically controlled, it is possible to arbitrarily deflect the rays in the X and Y directions.

The optical detector array 135, which is formed of a photodiode array 149, detects the deflected rays. The detected rays are converted into an electronic signal, and then the converted electronic signal is supplied to a LSI on the board 143. Here, it is preferable that an optical beam position detector be provided in the optical detector array 135 so as to detecting an optical beam from the surface emitting laser used for position detection. When the optical path deflecting apparatuses 148 are controlled so that the optical beam position detector can have a maximal output, it is possible to accurately control a position of the optical beam array.

The optical path deflecting apparatus 148 can respond at extremely high speed of a few $\mu$-seconds. Thus, the board-board optical interconnection apparatus 141 has an advantage in that carrier loss is caused less than conventional techniques on optical wiring.

Figure 26:
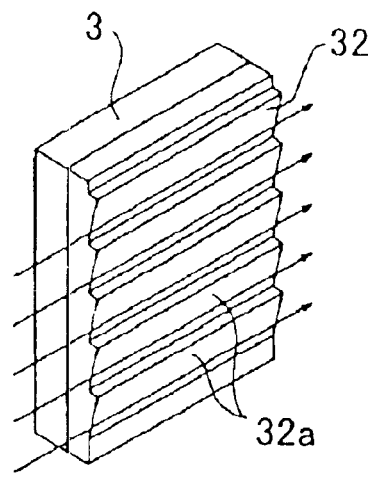
FIG. 26 is a diagram illustrating an injection direction of liquid crystal into a saw-toothed periodic structure according to the present invention.
Figure 27:
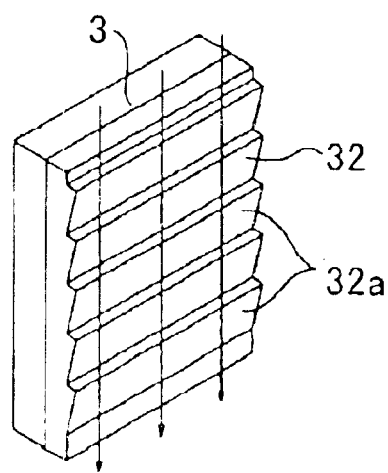
FIG. 27 is a diagram illustrating another injection direction of the liquid crystal into the saw-toothed periodic structure according to the present invention.

A description will now be given, with reference to FIG. 25 through FIG. 27, of some examples of the optical path deflecting element, the optical path deflecting apparatus, the optical writing apparatus and the optical interconnection apparatus according to the above-mentioned embodiments of the present invention.

In the first example, an example of an optical path deflecting element is described.

Figure 25A:
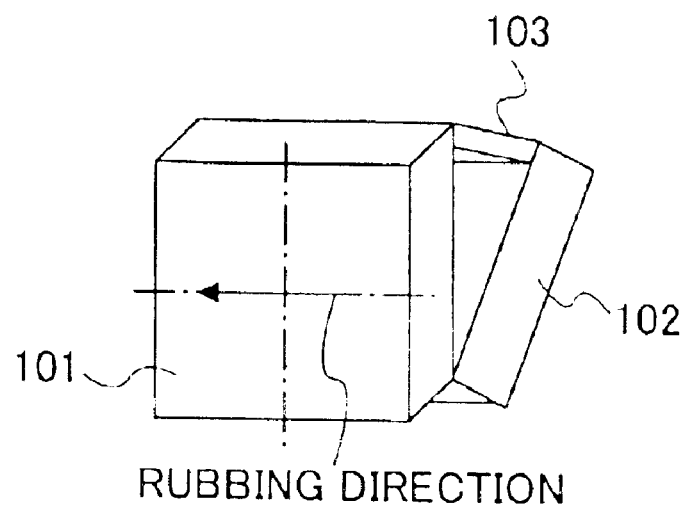
FIGS. 25A through 25C are diagrams for explaining some examples of an optical path deflecting elements according to the present invention.
Figure 25B:
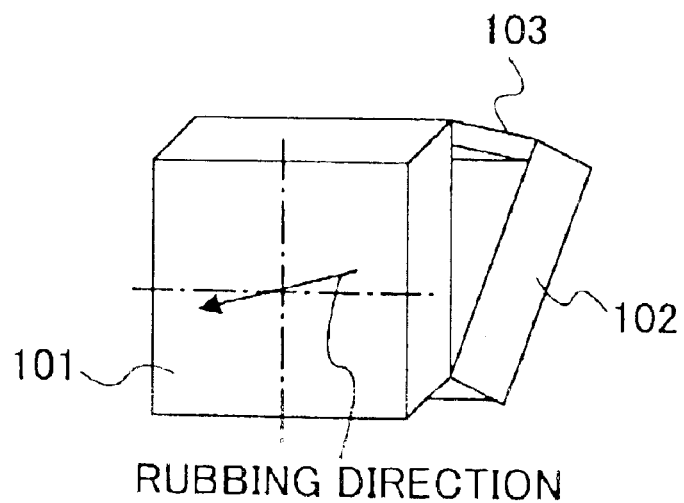
Figure 25C:
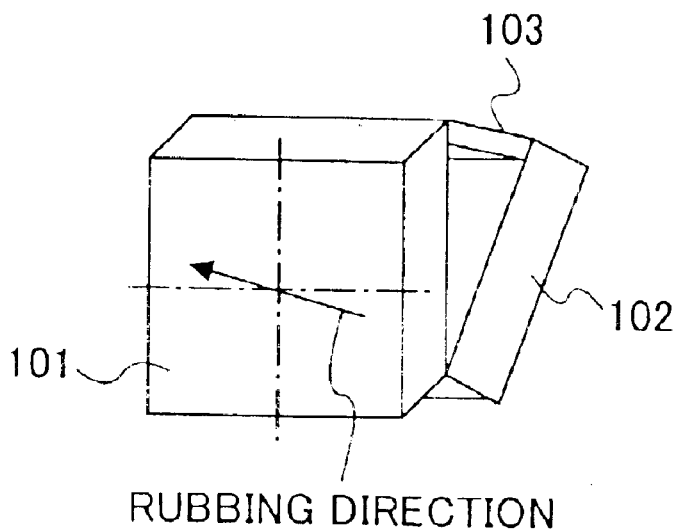

As shown in FIGS. 25A through 25C, two washed ITO-coated glass substrates 101 and 102 of 3 cm×3 cm in size and 3 mm in thickness are prepared. A polyimide aligning agent AL3046 (alignment layer) is coated on the glass substrate 101 and 102 in a thickness of about 800 Å. The surfaces of the glass substrates 101 and 102 are aligned in three directions as shown in FIGS. 25A through 25C by a rubbing alignment process such that the two substrates 101 and 102 have an identical alignment direction. A spacer 103 of 37 $\mu$m in thickness is provided at a position between the substrates 101 and 102 so as to form three kinds of wedge-shaped liquid crystal cells having a slope region of a slope angle of 0.2° corresponding to the three alignment directions. Ferroelectric liquid crystal (R5002 produced by Clariant) having a cone angle of about 90° is injected in accordance with the capillary injection method between the substrates 101 and 102 in a state where the substrates 101 and 102 are heated at 90° C. In the cooling process, a uniform alignment process is conducted by applying a direct voltage of 40 V between 70° C. and 55° C. The ferroelectric liquid crystal is enclosed by an adhesive. By using a polarizing microscope, it can be observed that uniform alignment is obtained in a region where the liquid crystal layer has a thickness of less than 6 $\mu$m.

A voltage of 40 V is applied to the three liquid crystal cells having the rubbing directions shown in FIGS. 25 A through 25C, and the cone angles are measured. The measurement direction is switched by alternating a polarity of the applied voltage between the stable condition direction and the unstable condition direction, and an angle between the two directions is found through the Cross-Nicol transmission inspection such that the angle makes transmittance minimal. In the three liquid crystal cells, it is observed that the stable condition directions thereof are approximately in the rubbing directions, and the unstable condition directions thereof are in directions rotated by 90° with respect to the corresponding stable condition directions. Accordingly, it is possible to achieve single-stable and single-domain alignment even in the wedge-shaped ferroelectric liquid crystal cell.

Here, it is observed that if the direct voltage is not applied to the ferroelectric liquid crystal in the cooling process, it is impossible to obtain uniform alignment in a single domain.

In the second example, laser light is radiated to a region in the wedge-shaped liquid crystal cell in FIG. 25A where the liquid crystal layer has a thickness of 2.5 $\mu$m. Here, a voltage of ±40 V is applied thereto so as to switch liquid crystal molecules, and a shift amount was measured on a CCD (Charge-Coupled Device) surface in the light exit side. When a polarization direction of incident light (linear polarization) is arranged in a direction where the angle between the stable condition direction and the unstable condition direction is bisected, the incident light is not shifted. Meanwhile, when the polarization direction is arranged in an asymmetric direction where the bisected direction is shifted by 30°, the incident light is shifted by about 0.5 mm per a distance of 1 m. However, there arises a noise light component such as a residual image in one of two shift positions of the optical path, and the contrast is comparatively low.

In the third example, laser light is radiated to regions in the wedge-shaped liquid crystal cells in FIGS. 25B and 25C where the liquid crystal layers have a thickness of 2.5 $\mu$m. Here, a voltage of ±40 V is applied thereto so as to switch liquid crystal molecules, and a shift amount was measured on a CCD (Charge-Coupled Device) surface in the light exit side. A polarization direction of incident light (linear polarization) is arranged to coincide with the stable condition direction. In both of the liquid crystal cells, it was observed that the optical path is comparatively largely shifted by about 0.8 mm per a distance of 1 m. However, there arises a noise light component such as a residual image in one of two shift positions of the optical path, and the contrast is comparatively low.

In the fourth example, a polarizing plate is provided in the light exit side in the same structure as the third example. Although a shift amount of optical path is not changed compared with the third example, the noise light component is eliminated and the contrast is improved. However, the light intensity is slightly decreased due to the polarizing plate.

In the fifth example, a dry-etching process is conducted for a silica glass substrate of 3 cm×3 cm in size and 1 mm in thickness so as to form a saw-toothed periodic structure in an area of 1 cm×1 cm such that the tooth has a slope angle of about 0.5° and a pitch of 100 $\mu$m. Then, ITO (transparent electrode film) is sputtered in a thickness of 2000 Å on the saw-toothed surface. Furthermore, the polyimide aligning agent AL3046 (alignment layer) is coated in a thickness of about 800 Å on the substrate surface. The substrate surface is aligned in the rubbing process so that a stable condition direction of a homogeneous direction can be perpendicular to a slope direction of a slope region. The resulting substrate and a smooth ITO-coated glass substrate are bonded by using an adhesive containing beads such that a thin portion of the liquid crystal layer becomes 1.5 $\mu$m. Ferroelectric liquid crystal (R5002 produced by Clariant) is injected between the two substrates in a state where the substrates are heated at 90° C. under the capillary injection method such that the injection direction is along the saw-tooth of the periodic structure as shown in FIG. 26. In a cooling process, a direct voltage of 20 V/μm is applied between 70° C. and 55° C., and then the liquid crystal is enclosed. At this time, it is observed that almost uniform alignment is obtained in the saw-tooth of 1 cm×1 cm. Laser light is radiated in the liquid crystal cell and liquid crystal molecules are switched by applying a voltage of ±40 V. At this time, a shift amount is measured on a CCD surface in the light exit side. Here, a polarization direction of the incident light is set in a slope direction of the saw-tooth. The measurement is taken at five points by considering the saw-tooth as an opposite angle. It is observed that the optical path shift amount is 0.8 mm at all points. It is possible to uniformly shift an optical path in a wide area.

Here, an optical path deflecting element was fabricated in a method slightly different from the above-mentioned optical path deflecting element, that is, in such a way that the liquid crystal is injected in the direction perpendicular to the saw-toothed periodic structure. In this case, it took more than the twice time to inject the liquid crystal. Furthermore, it was impossible to uniformly inject the liquid crystal and achieve uniform alignment.

In the sixth example, saw-toothed periodic structures having a slope angle of about 0.2° and a pitch of 1 mm were formed in the same method as the fifth example. Then, a liquid crystal cell as shown in FIG. 12 is fabricated by providing a middle substrate of 3 mm in thickness to the substrates having the saw-toothed periodic structures. Laser light having a wavelength of 633 nm is radiated in the liquid crystal cell, and liquid crystal molecules are switched by applying a same polarity and a same voltage to both of the saw-toothed periodic structures. At this time, a shift amount was measured with a high-resolution CCD camera that was provided in the light exit side. From the observation result, it was found that an optical path is shifted by about 20 μm per a measurement distance 30 cm. Furthermore, when the shift amount is examined under other measurement distances of 50 cm and 1 m, it was found that the optical path is shifted by about 20 μm in the both cases. Thus, it is concluded that the shift amount is constant after the light exits the liquid crystal cell.

In the seventh example, another same liquid crystal cell as the sixth example is fabricated, and the two liquid crystal cells were arranged such that an edge, direction of the saw-toothed periodic structure of one of the liquid crystal cells is orthogonal to that of the other liquid crystal cell. Laser light is radiated in these liquid crystal cells, and liquid crystal molecules are switched by applying a voltage to the liquid crystal cells. At this time, it was observed that if only one of the liquid crystal cells is driven, an optical path is shifted in a horizontal direction and that if only the other liquid crystal cell is driven, an optical path is shifted in a vertical direction. Furthermore, when both of the liquid crystal cells are driven at same timing and an exit optical beam is observed with a CCD camera, the optical beam was found at four shift positions. Here, polarity of the voltage applied to the two liquid crystal cells was different form each other, and the drive frequency was set as 100 Hz. Also, the observed optical beam was out of focus.

In the eighth example, a λ/2 plate formed of mica is provided between the two liquid crystal cells that are arranged in the same configuration as the seventh example. When the two liquid crystal cells were driven, it was observed that an optical path is shifted in the vertical and horizontal directions like the seventh example. Here, a voltage is applied to the liquid crystal cells under identical polarity, and the drive frequency is set as 100 Hz. Compared with the optical path deflecting element without the λ/2 plate, the optical beam was clearer at the four positions.

In the ninth example, a liquid crystal cell was fabricated by forming a saw-toothed periodic structure having a slope angle of about 0.2° and a pitch of 1 mm. Here, ITO transparent electrodes and variable resistor elements are provided corresponding to individual teeth as shown in FIG. 23. Laser light of the wavelength of 633 nm is radiated in the liquid crystal cell, and liquid crystal molecules are switched by applying a voltage to each of the teeth. At this time, a shift amount was measured on a CCD surface in the light exit side.

The incident laser light is formed of a plurality of laser rays, and the laser rays are radiated at positions corresponding to the individual teeth. When resistor values of the variable resistor element are set so as to apply the voltage to a tooth corresponding to a laser ray to be shifted, it is possible to shift only the laser ray. The shift amount was about 0.7 mm per a distance 1 m. The measured shift amount almost coincided with an estimated value of beam shift through refraction.

Next, a case where the incident laser light is formed of one laser ray and the beam diameter is enlarged in 10 mm by using a beam expander was examined. In this case, when the variable resistor elements are set such that a voltage of ±40 V is applied to all the saw-toothed structures, it is possible to find that an optical path is shifted. The shift amount was about 0.6 mm per a distance of 1 m, and the shift amount almost coincided with an estimated value of beam shift through 1st-order diffractive ray. Furthermore, the resistor values of the variable resistor elements were set such that a voltage is periodically applied to each of the saw-toothed periodic structures. For instance, voltages: ON, ON, OFF, OFF, ON, ON, . . . were applied to the saw-toothed periodic structures: saw-tooth 1, saw-tooth 2, saw-tooth 3, saw-tooth 4, saw-tooth 5, saw-tooth 6, . . . . In this case, the shift amount is about 0.3 mm per a distance 1 m, and it was observed that an optical path is deflected in accordance with the new periodic structures.

In the tenth example, an image displaying apparatus according to the present invention is examined. If a conventional image displaying apparatus includes an optical path deflecting part for a pixel-shift element (ref. Japanese Laid-Open Patent Application No. 06-324320), an optical element as the optical path defecting part works for shifting an optical path at two positions in the vertical direction and at two positions in the horizontal direction, that is, at four positions in total (two-dimensional four-point picture element shifting). A crystal phase modulating element formed of ferroelectric liquid crystal or the like and a birefringent medium formed of an electrooptical element or the like are combined, and two pairs of the crystal phase modulating elements and the birefringent media are constituted for the vertical and the horizontal directions. The optical element has some problems;

i) There arises light loss on an interface between the crystal phase modulating element and the birefringent medium because the combination the crystal phase modulating element and the birefringent medium shifts an optical path.

ii) The contrast tends to be increased due to light scattering on the interface.

iii) The fabrication cost is high because of the expensive electrooptical element for the birefringent medium.

For these problems, a conventional image displaying apparatus using the optical element cannot produce a high-quality image. Furthermore, the fabrication cost tends to be increased.

According to the image displaying apparatus 81 using the optical path deflecting apparatus 90 as shown in FIG. 15, it becomes possible to eliminate the above problems as mentioned with respect to the previous embodiments. Accordingly, the image displaying apparatus according to this example can produce a high-quality image and be fabricated at a favorable cost.

In the eleventh example, an optical writing apparatus as shown in FIG. 22 is fabricated. In the optical writing apparatus, an illuminant is formed of LEDs arranged in an array and a pitch of picture elements is set as 40 μm. Then, a liquid crystal cell manufactured in the same way as the example 6 is provided in the optical writing apparatus as an optical path deflecting element. Furthermore, a microlens array, which is not illustrated, is provided to focus an optical path on a recording body. The optical writing apparatus is used to expose an image on the recording body. Here, when the image is exposed without driving the optical path deflecting element, it is observed that the pitch of the picture elements of the illuminant array is equal to a pitch of the image. On the other hand, when the image is exposed by using the optical path deflecting element, it is observed that the image pitch is finer than the pitch of the picture elements of the illuminant array. Namely, it becomes possible to obtain a high-definition image.

In the twelfth example, a board-board optical interconnection apparatus as shown in FIG. 24 is fabricated. The board-board optical interconnection apparatus has an interval of about 30 mm between boards and a pitch of 250 μm of laser rays and detectors. In the board-board optical interconnection apparatus, an optical path deflecting element is formed of saw-toothed periodic structures so as to face each other, and such optical path deflecting elements are layered in five stages. A mold of nickel is formed in a cutting process, and the saw-tooth is formed in accordance with the mold. A photopolymer resin is provided in the mold and an ultraviolet ray is radiated to the photopolymer resin in the mold. By this radiation, a saw-toothed substrate of a pitch of about 10 μm and a slope angle of about 22° is manufactured. Here, the other fabrication processes are similar to the above-mentioned examples. If individual drives of the five-layered optical path deflecting elements are set, it is possible to implement an optical wiring between the boards. According to the board-board optical interconnection apparatus, it is possible to reduce response time to several hundreds of μ seconds although conventional board-board optical interconnection apparatuses take between several milliseconds and several seconds.

The present invention is not limited to the specifically disclosed embodiments, and variations and modifications may be made without departing from the scope of the present invention.

The present application is based on Japanese priority applications No. 2002-114526 filed Apr. 17, 2002 and No. 2003-080507 filed Mar. 24, 2003, the entire contents of which are hereby incorporated by reference.

What is claimed is:

1. An optical path deflecting element, comprising:
   a pair of transparent substrates being arranged to face each other;
   transparent electrode films being provided on said substrates, said transparent electrode films to which a voltage having an inverse polarity is selectively applied;
   an alignment layer being provided in inner sides of said substrates; and
   a liquid crystal layer being formed of a chiral smectic C phase between said substrates via said alignment layer, said liquid crystal layer being homogeneously aligned by said alignment layer,
   wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, and said liquid crystal layer is formed of a phase-transition liquid crystal material that does not pass through a smectic A phase.

2. The optical path deflecting element as claimed in claim 1, wherein said stable condition direction of said liquid crystal layer in the single-stable condition is along a major axis direction of liquid crystal molecules in the aligned liquid crystal layer, said unstable condition direction thereof is along a direction different from said stable condition direction, and only if a voltage is applied between said transparent electrode films, said major axis direction of the liquid crystal molecules becomes an alignment direction in accordance with the applied voltage.

3. The optical path deflecting element as claimed in claim 1, wherein said liquid crystal layer is aligned such that one of said stable condition direction and said unstable condition direction of the liquid crystal layer in the single-stable condition coincides with a direction perpendicular to a slope direction of the slope region.

4. The optical path deflecting element as claimed in claim 1, wherein one of said substrates has a saw-toothed periodic structure, whose section has a saw-toothed shape, on a facing surface thereof, and said slope region has slope surfaces that are divided by a plurality of teeth of said saw-toothed periodic structure.

5. The optical path deflecting element as claimed in claim 1, wherein said stable condition direction and said unstable condition direction of the liquid crystal layer in the single stable condition are asymmetric to a center axis when a polarization direction of a linear polarization entering the liquid crystal layer is considered as said center axis.

6. An optical path deflecting element as claimed in claim 5, wherein said polarization direction of the linear polarization entering the liquid crystal layer coincides with one of the stable condition direction and the unstable condition direction of the liquid crystal layer in the single-stable condition.

7. The optical path deflecting element as claimed in claim 1, further comprising a polarizing plate in a light exit side thereof.

8. The optical path deflecting element as claimed in claim 5, wherein said liquid crystal layer has an angle of 90° between the stable condition direction and the unstable condition direction thereof in the single-stable condition, and said polarization direction of the linear polarization entering the liquid crystal layer is parallel to one of said stable condition direction and said unstable condition direction thereof.

9. The optical path deflecting element as claimed in claim 4, wherein said saw-toothed periodic structure on said substrate is formed such that a height h of a step part between a top and a bottom of said saw-toothed periodic structure falls in a range of 1 μm≦h≦10 μm.

10. The optical path deflecting element as claimed in claim 9, wherein said liquid crystal layer has a refractive index no with respect to an ordinary ray component and a refractive index ne with respect to an extraordinary ray component one of which is set in a range of ±7% toward a refractive index ng of said saw-toothed periodic structure on the substrate.

11. The optical path deflecting element as claimed in claim 10, wherein said refractive index ng of the saw-toothed periodic structure on the substrate, said refractive index no/ne of the liquid crystal layer with respect to the ordinary ray component/the extraordinary ray component, and said height h of the step part of the saw-toothed periodic structure on the substrate are set to satisfy an inequality for a wavelength λ of at least a portion of incident light;

$$0.8 \cdot \Delta n \cdot h \leq \lambda \leq 1.25 \cdot \Delta n \cdot h,$$

where Δn is an absolute value of a difference between said refractive index ng of the saw-toothed periodic structure and said refractive index no/ne of the liquid crystal layer with respect to the ordinary ray component/the extraordinary ray component, that is, Δn=|ng−no/ne|.

12. The optical path deflecting element as claimed in claim 1, wherein said slope region for said liquid crystal layer is divided into a first slope region and a second slope region located at a predetermined interval with respect to a propagation direction of incident light, said first slope region and said second slope region are arranged in parallel to face each other such that the incident light is deflected in accordance with a difference between refractive indexes of said first slope region and said liquid crystal layer, said deflected light is deflected once again in accordance with a difference between refractive indexes of said second slope region and said liquid crystal layer, and said deflected light exits in parallel to said incident light.

13. The optical path deflecting element as claimed in claim 12, further comprising a transparent middle substrate locating said first slope region away from said second slope region at a predetermined interval.

14. An optical path deflecting apparatus, comprising:
an optical path deflecting element, comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer; and
a voltage applying part applying a voltage of an inversed polarity selectively between said transparent electrode films of said optical path deflecting element,
wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, and said liquid crystal layer is formed of a phase-transition liquid crystal material that does not pass through a smectic A phase.

15. An optical path deflecting apparatus, comprising:
a first optical path deflecting element, comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer;
a second optical path deflecting element, comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer; and
a voltage applying part applying a voltage of an inversed polarity selectively between said transparent electrode films of said first optical path deflecting element and said second optical path deflecting element,
wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, said first optical path deflecting element and said second optical path deflecting element are provided in an identical optical path such that an optical path deflection direction of said first optical path deflecting element is orthogonal to an optical path deflection direction of said second optical path deflecting element, and said liquid crystal layer is formed of a phase-transition liquid crystal material that does not pass through a smectic A phase.

16. The optical path deflecting apparatus as claimed in claim 15, further comprising a polarization direction switching part switching a polarization direction of light from said first optical path deflecting element by an angle of 90°, said polarization direction switching part being provided between said first optical path deflecting element and said second optical path deflecting part.

17. The optical path deflecting apparatus as claimed in claim 15, wherein said first optical path deflecting element and said second optical path deflecting element are provided such that a maximal slope direction of said slope region of the first optical path deflecting element becomes orthogonal to a maximal slope direction of said slope region of the second optical path deflecting element.

18. The optical path deflecting apparatus as claimed in claim 16, wherein said polarization direction switching part is a half-wavelength plate.

19. The optical path deflecting apparatus as claimed in claim 16, wherein said polarization direction switching part is a twist-nematic liquid crystal cell.

20. An image displaying apparatus, comprising:

an image displaying element being formed of a plurality of two-dimensionally arranged picture elements capable of controlling light in accordance with image information;

an illuminant apparatus illuminating said image displaying element;

an optical apparatus monitoring an image pattern displayed on said image displaying element;

a display driving part forming an image field of a plurality of temporally-divided subfields; and an optical path deflecting apparatus deflecting an optical path of light from each of said picture elements of the image displaying element for each of said subfields, said optical path deflecting apparatus comprising: an optical path deflecting element comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer; and a voltage applying part applying a voltage of an inversed polarity selectively between said transparent electrode films of said optical path deflecting element, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, and said stable condition direction and said unstable condition direction alternate in accordance with a polarity of a voltage applied between said transparent electrode films.

21. The image displaying apparatus as claimed in claim 20, wherein one of said substrates of the optical path deflecting apparatus has a saw-toothed periodic structure, whose section has a saw-toothed shape, on a facing surface thereof, the slope region of said substrate has slope surfaces that are divided by a plurality of teeth of said saw-toothed periodic structure, and said saw-toothed periodic structure has a pitch d as follows;

$$0.9 \cdot (2\sqrt{2} \cdot \lambda \cdot L/X) < d < 1.1 \cdot (2 \cdot \lambda \cdot L/X),$$

where $\lambda$ is a wavelength of all or a portion of incident light, L is a length of an optical path between said image displaying element and said optical path deflecting element, and X is a pitch of picture elements of said image displaying element.

22. The image displaying apparatus as claimed in claim 20, wherein said optical path deflecting apparatus is arranged to deflect an optical path in an oblique direction with respect to an array direction of the two-dimensionally arranged picture elements of said image displaying element.

23. The image displaying apparatus as claimed in claim 22, wherein one of said substrates of the optical path deflecting apparatus has a saw-toothed periodic structure, whose section has a saw-toothed shape, on a facing surface thereof, said slope region of said substrate has slope surfaces that are divided by a plurality of teeth of said saw-toothed periodic structure, and said saw-toothed periodic structure has a pitch d as follows;

$$0.9 \cdot (2\sqrt{2} \cdot \lambda \cdot L/X) < d < 1.1 \cdot (2\sqrt{2} \cdot \lambda \cdot L/X),$$

where $\lambda$ is a wavelength of all or a portion of incident light, L is a length of an optical path between said image displaying element and said optical path deflecting element, and X is a pitch of picture elements of said image displaying element.

24. An optical writing apparatus, comprising:

an illuminant array being formed by arranging a plurality of illuminants at a predetermined pitch of picture elements;

an optical lens focusing rays emitted from said illuminants on a recording body; and an optical path deflecting apparatus shifting optical paths of said rays emitted from said illuminants in an array direction of said illuminants, said optical path deflecting apparatus comprising: an optical path deflecting element comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer; and a voltage applying part applying a voltage of an inversed polarity selectively between said transparent electrode films of said optical path deflecting element, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, and said stable condition direction and said unstable condition direction alternate in accordance with a polarity of a voltage applied between said transparent electrode films.

25. The optical path deflecting apparatus as claimed in claim 14, wherein at least one of said transparent electrodes has a divided line electrode structure corresponding to a pitch of a saw-toothed periodic structure on said substrates.

26. An optical interconnection apparatus, comprising:

an illuminant array generating an optical beam array;

a lens array focusing said optical beam array;

an optical detector array receiving said optical beam array;

a plurality of optical path deflecting apparatuses deflecting a propagation direction of said optical beam array, said optical path deflecting apparatuses being arranged in a cascade fashion between said illuminant array and said optical detector array, each of said optical path deflecting apparatuses comprising: an optical path deflecting element comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer; and a voltage applying part applying a voltage of an inversed polarity selectively between said transparent electrode films of said optical path deflecting element, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, and one of said transparent electrodes has a divided line electrode structure corresponding to a pitch of a saw-toothed periodic structure on said substrates.

27. An optical element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, and said liquid crystal layer is formed of a phase-transition liquid crystal material that does not pass through a smectic A phase.

28. The optical element as claimed in claim 27, wherein said liquid crystal layer is aligned such that one of said stable condition direction and said unstable condition direction of the liquid crystal layer in the single stable condition coincides with a direction perpendicular to a slope direction of the slope region.

29. The optical element as claimed in claim 27, wherein one of said substrates has a saw-toothed periodic structure, whose section has a saw-toothed shape, on a facing surface thereof, and said slope region has slope surfaces that are divided by a plurality of teeth of said saw-toothed periodic structure.

30. The optical element as claimed in claim 27, wherein said slope region for said liquid crystal layer is divided into a first slope region and a second slope region located at a predetermined interval with respect to a propagation direction of incident light, said first slope region and said second slope region are arranged in parallel to face each other such that the incident light is deflected in accordance with a difference between refractive indexes of said first slope region and said liquid crystal layer, said deflected light is deflected once again in accordance with a difference between refractive indexes of said second slope region and said liquid crystal layer, and said deflected light exits in parallel to said incident light.

31. The optical path deflecting element as claimed in claim 30, further comprising a transparent middle substrate locating said first slope region away from said second slope region at a predetermined interval.

32. An optical element manufacturing method for manufacturing an optical element comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, and said liquid crystal layer is formed of a phase-transition liquid crystal material that does not pass through a smectic A phase, the optical element manufacturing method comprising:

an alignment processing step of applying a voltage between the transparent electrode films under control of speed of decreasing a temperature in a cooling process from one of an isotropic phase and a cholesteric phase and setting a stable condition direction in a single stable condition by homogeneously aligning liquid crystal in the liquid crystal layer.

33. An optical element manufacturing method for manufacturing an optical element comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said slope region for said liquid crystal layer is divided into a first slope region and a second slope region located at a predetermined interval, said first slope region and said second slope region are arranged in parallel to face each other such that incident light is deflected in accordance with a difference between refractive indexes of said first slope region and said liquid crystal layer, said deflected light is deflected once again in accordance with a difference between refractive indexes of said second slope region and said liquid crystal layer, and said deflected light exits in parallel to said incident light, the optical element manufacturing method comprising:

a liquid crystal injection step of injecting liquid crystal along a saw-toothed periodic structure formed on a facing surface of one of said substrates.

34. An optical path deflecting element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, and said liquid crystal layer is aligned such that one of said stable condition direction and said unstable condition direction of the liquid crystal layer in the single-stable condition coincides with a direction perpendicular to a slope direction of the slope region.

35. An optical path deflecting element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, and one of said substrates has a saw-toothed periodic structure, whose section has a saw-toothed shape, on a facing surface thereof, and said slope region has slope surfaces that are divided by a plurality of teeth of said saw-toothed periodic structure.

36. The optical path deflecting element as claimed in claim 35, wherein said saw-toothed periodic structure on said substrate is formed such that a height h of a step part between a top and a bottom of said saw-toothed periodic structure falls in a range of $1\ \mu m \leq h \leq 10\ \mu m$.

37. The optical path deflecting element as claimed in claim 36, wherein said liquid crystal layer has a refractive index no with respect to an ordinary ray component and a refractive index ne with respect to an extraordinary ray component one of which is set in a range of ±7% toward a refractive index ng of said saw-toothed periodic structure on the substrate.

38. The optical path deflecting element as claimed in claim 37, wherein said refractive index ng of the saw-toothed periodic structure on the substrate, said refractive index no/ne of the liquid crystal layer with respect to the ordinary ray component/the extraordinary ray component, and said height h of the step part of the saw-toothed periodic structure on the substrate are set to satisfy an inequality for a wavelength λ of at least a portion of incident light;

$$0.8 \cdot \Delta n \cdot h \leq \lambda \leq 1.25 \cdot \Delta n \cdot h,$$

where Δn is an absolute value of a difference between said refractive index ng of the saw-toothed periodic structure and said refractive index no/ne of the liquid crystal layer with respect to the ordinary ray component/the extraordinary ray component, that is, $\Delta n = |ng - no/ne|$.

39. An optical path deflecting element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, and said liquid crystal layer has an angle of 90° between the stable condition direction and the unstable condition direction thereof in the single-stable condition, and said polarization direction of the linear polarization entering the liquid crystal layer is parallel to one of said stable condition direction and said unstable condition direction thereof.

40. An optical path deflecting element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, said slope region for said liquid crystal layer is divided into a first slope region and a second slope region located at a predetermined interval with respect to a propagation direction of incident light, said first slope region and said second slope region are arranged in parallel to face each other such that the incident light is deflected in accordance with a difference between refractive indexes of said first slope region and said liquid crystal layer, said deflected light is deflected once again in accordance with a difference between refractive indexes of said second slope region and said liquid crystal layer, and said deflected light exits in parallel to said incident light.

41. The optical path deflecting element as claimed in claim 40, further comprising a transparent middle substrate locating said first slope region away from said second slope region at a predetermined interval.

42. An optical path deflecting apparatus, comprising:
a first optical path deflecting element, comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer;
a second optical path deflecting element, comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer;
a voltage applying part applying a voltage of an inversed polarity selectively between said transparent electrode films of said first optical path deflecting element and said second optical path deflecting element; and
a polarization direction switching part switching a polarization direction of light from said first optical path deflecting element by an angle of 90°, said polarization direction switching part being provided between said first optical path deflecting element and said second optical path deflecting part,
wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, and said first optical path deflecting element and said second optical path deflecting element are provided in an identical optical path such that an optical path deflection direction of said first optical path deflecting element is orthogonal to an optical path deflection direction of said second optical path deflecting element.

43. The optical path deflecting apparatus as claimed in claim 42, wherein said polarization direction switching part is a half-wavelength plate.

44. The optical path deflecting apparatus as claimed in claim 42, wherein said polarization direction switching part is a twist-nematic liquid crystal cell.

45. An optical path deflecting apparatus, comprising:
a first optical path deflecting element, comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer;
a second optical path deflecting element, comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer; and
a voltage applying part applying a voltage of an inversed polarity selectively between said transparent electrode films of said first optical path deflecting element and said second optical path deflecting element,
wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, said first optical path deflecting element and said second optical path deflecting element are provided in an identical optical path such that an optical path deflection direction of said first optical path deflecting element is orthogonal to an optical path deflection direction of said second optical path deflecting element, and said first optical path deflecting element and said second optical path deflecting element are provided such that a maximal slope direction of said slope region of the first optical path deflecting element becomes orthogonal to a maximal slope direction of said slope region of the second optical path deflecting element.

46. An optical path deflecting apparatus, comprising:
an optical path deflecting element, comprising: a pair of transparent substrates being arranged to face each other; transparent electrode films being provided on said substrates, said transparent electrode films to which a voltage having an inverse polarity is selectively applied; an alignment layer being provided in inner sides of said substrates; and a liquid crystal layer being formed of a chiral smectic C phase between said substrates via said alignment layer, said liquid crystal layer being homogeneously aligned by said alignment layer; and a voltage applying part applying a voltage of an inversed polarity selectively between said transparent electrode films of said optical path deflecting element, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said stable condition direction and said unstable condition direction alternate in accordance with a polarity of a voltage applied between said transparent electrode films, and at least one of said transparent electrodes has a divided line electrode structure corresponding to a pitch of a saw-toothed periodic structure on said substrates.

47. An optical element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, and said liquid crystal layer is aligned such that one of said stable condition direction and said unstable condition direction of the liquid crystal layer in the single stable condition coincides with a direction perpendicular to a slope direction of the slope region.

48. An optical element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, one of said substrates has a saw-toothed periodic structure, whose section has a saw-toothed shape, on a facing surface thereof, and said slope region has slope surfaces that are divided by a plurality of teeth of said saw-toothed periodic structure.

49. An optical element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, one of said substrates has a saw-toothed periodic structure, whose section has a saw-toothed shape, on a facing surface thereof, said slope region for said liquid crystal layer is divided into a first slope region and a second slope region located at a predetermined interval with respect to a propagation direction of incident light, said first slope region and said second slope region are arranged in parallel to face each other such that the incident light is deflected in accordance with a difference between refractive indexes of said first slope region and said liquid crystal layer, said deflected light is deflected once again in accordance with a difference between refractive indexes of said second slope region and said liquid crystal layer, and said deflected light exits in parallel to said incident light.

50. The optical path deflecting element as claimed in claim 49, further comprising a transparent middle substrate locating said first slope region away from said second slope region at a predetermined interval.

51. An optical element, comprising:

a pair of transparent substrates being arranged to face each other;

transparent electrode films being provided on said substrates, said transparent electrode films to which a voltage having an inverse polarity is selectively applied;

an alignment layer being provided in inner sides of said substrates; and a liquid crystal layer being formed of a chiral smectic C phase between said substrates via said alignment layer, said liquid crystal layer being homogeneously aligned by said alignment layer, wherein said substrates are arranged such that said substrates have a slope angle between said substrates so as to form a slope region where said liquid crystal layer is formed, said liquid crystal layer is formed by homogeneously aligning liquid crystal therein in a single-stable condition where a stable condition direction and an unstable condition direction are in an identical plane in said slope region, said slope region for said liquid crystal layer is divided into a first slope region and a second slope region located at a predetermined interval with respect to a propagation direction of incident light, said first slope region and said second slope region are arranged in parallel to face each other such that the incident light is deflected in accordance with a difference between refractive indexes of said first slope region and said liquid crystal layer, said deflected light is deflected once again in accordance with a difference between refractive indexes of said second slope region and said liquid crystal layer, and said deflected light exits in parallel to said incident light.

52. The optical path deflecting element as claimed in claim 49, further comprising a transparent middle substrate locating said first slope region away from said second slope region at a predetermined interval.

* * * * *